(12) United States Patent
Zimeri et al.

(10) Patent No.: US 8,563,065 B2
(45) Date of Patent: *Oct. 22, 2013

(54) PRODUCTION OF LOW CALORIE, EXTRUDED, EXPANDED FOODS HAVING A HIGH FIBER CONTENT

(75) Inventors: Jeanny E. Zimeri, Budd Lake, NJ (US); Lynn Haynes, Morris Plains, NJ (US); Allan R. Olson, Kalamazoo, MI (US); Vijay Kumar Arora, Lake Forest, NJ (US); Louise Slade, Morris Plains, NJ (US); Harry Levine, Morris Plains, NJ (US); Meera Kweon, Morris Plains, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/437,485

(22) Filed: Apr. 2, 2012

(65) Prior Publication Data

US 2012/0276268 A1    Nov. 1, 2012

Related U.S. Application Data

(60) Continuation of application No. 12/631,587, filed on Dec. 4, 2009, now Pat. No. 8,163,324, which is a division of application No. 11/258,759, filed on Oct. 26, 2005, now Pat. No. 7,648,723.

(51) Int. Cl.
*A21D 13/00* (2006.01)

(52) U.S. Cl.
USPC ........... 426/559; 426/516; 426/445; 426/446; 426/448; 426/449; 426/518; 426/523; 426/496; 426/621

(58) Field of Classification Search
USPC ......... 426/549, 516, 445, 446, 447, 518, 523, 426/496, 621, 618, 619, 620
See application file for complete search history.

(56) References Cited

U.S. PATENT DOCUMENTS

| 2,400,494 A | 5/1946 | Fisher |
| 2,611,767 A | 9/1952 | Allen et al. |

(Continued)

FOREIGN PATENT DOCUMENTS

| AU | 58059/94 | 7/1994 |
| EP | 0 086 527 | 8/1948 |

(Continued)

OTHER PUBLICATIONS

U.S. Appl. No. 11/637,589, filed Dec. 12, 2006, Alexandre.

(Continued)

*Primary Examiner* — Drew Becker
*Assistant Examiner* — Preston Smith
(74) *Attorney, Agent, or Firm* — Greenblum & Bernstein, P.L.C.

(57) ABSTRACT

Extruded, directly expanded, high fiber reduced calorie food products, such as a ready-to-eat (RTE) cereal or sweet or savory snack, are produced at high production rates without substantial loss of extrusion functionality and extrudability by replacing a substantial portion of at least one flour with a gelatinized, enzyme-resistant starch type III ingredient or bulking agent as a reduced-calorie, high fiber flour replacer. The resistant starch type III ingredient or bulking agent contains an enzyme-resistant starch type III having a melting point with an endothermic peak temperature of at least about 140° C., and may have a water-holding capacity of less than 3 grams water per gram of the starch-based bulking agent. The total dietary fiber retention of the gelatinized, starch-based bulking agent may be at least about 90% by weight after extrusion using a die temperature of least about 100° C., and a die pressure of at least about 150 psig.

20 Claims, 4 Drawing Sheets

(56) References Cited

U.S. PATENT DOCUMENTS

| | | | |
|---|---|---|---|
| 2,978,446 A | 4/1961 | Battista et al. |
| 3,023,104 A | 2/1962 | Battista |
| 3,086,890 A | 4/1963 | Sarko et al. |
| 3,238,064 A | 3/1966 | Macarus et al. |
| 3,493,319 A | 2/1970 | Berni et al. |
| 3,515,591 A | 6/1970 | Feldman et al. |
| 3,666,557 A | 5/1972 | Jensen et al. |
| 3,676,150 A | 7/1972 | Glicksman et al. |
| 3,729,380 A | 4/1973 | Sugimoto et al. |
| 3,788,946 A | 1/1974 | Kurimoto et al. |
| 3,861,293 A | 1/1975 | Buffa et al. |
| 3,881,991 A | 5/1975 | Kurimoto et al. |
| 3,886,295 A | 5/1975 | Burke et al. |
| 3,950,543 A | 4/1976 | Buffa et al. |
| 4,042,714 A | 8/1977 | Torres |
| 4,219,580 A | 8/1980 | Torres |
| 4,247,568 A | 1/1981 | Carrington et al. |
| 4,320,151 A | 3/1982 | Cole |
| 4,371,562 A | 2/1983 | Friedman et al. |
| 4,377,601 A | 3/1983 | Dreese et al. |
| 4,442,132 A | 4/1984 | Kim |
| 4,461,782 A | 7/1984 | Robbins et al. |
| 4,631,195 A | 12/1986 | Colliopoulos et al. |
| 4,756,921 A | 7/1988 | Calandro et al. |
| 4,774,099 A | 9/1988 | Feeney et al. |
| 4,777,045 A | 10/1988 | Vanderveer et al. |
| 4,837,112 A | 6/1989 | Calandro et al. |
| 4,871,574 A | 10/1989 | Yamazaki et al. |
| 4,927,654 A | 5/1990 | Barnett et al. |
| 4,950,140 A | 8/1990 | Pflaumer et al. |
| 4,959,466 A | 9/1990 | White |
| H937 H | 7/1991 | Sloan |
| 5,051,271 A | 9/1991 | Ivengar et al. |
| 5,073,387 A | 12/1991 | Whistler |
| 5,077,074 A | 12/1991 | van Lengerich |
| 5,094,872 A | 3/1992 | Furcsik et al. |
| 5,104,669 A | 4/1992 | Wolke et al. |
| 5,169,662 A | 12/1992 | Spicer |
| 5,176,936 A | 1/1993 | Creighton et al. |
| 5,194,284 A | 3/1993 | Chin et al. |
| 5,230,913 A | 7/1993 | Klemann |
| 5,281,276 A | 1/1994 | Chiu et al. |
| 5,330,779 A | 7/1994 | Watanabe |
| 5,348,758 A | 9/1994 | Fuisz et al. |
| 5,356,644 A | 10/1994 | Hendrick et al. |
| 5,364,652 A | 11/1994 | Ohkuma et al. |
| 5,370,894 A | 12/1994 | Singer |
| 5,374,442 A | 12/1994 | Harris et al. |
| 5,378,486 A | 1/1995 | Sullivan |
| 5,387,426 A | 2/1995 | Harris et al. |
| 5,391,388 A | 2/1995 | Lewis et al. |
| 5,393,550 A | 2/1995 | Tarr et al. |
| 5,395,640 A | 3/1995 | Harris et al. |
| 5,409,542 A | 4/1995 | Henley et al. |
| 5,431,929 A | 7/1995 | Yatka et al. |
| 5,436,019 A | 7/1995 | Harris et al. |
| 5,445,678 A | 8/1995 | Whistler |
| 5,470,391 A | 11/1995 | Mallee et al. |
| 5,472,732 A | 12/1995 | Ohkuma et al. |
| 5,480,669 A | 1/1996 | Zallie et al. |
| 5,480,699 A * | 1/1996 | Gerhartl et al. ............... 428/171 |
| 5,505,783 A | 4/1996 | Fitton et al. |
| 5,505,982 A | 4/1996 | Krawczyk et al. |
| 5,523,111 A | 6/1996 | Nickel et al. |
| 5,547,513 A | 8/1996 | Mallee et al. |
| 5,571,334 A | 11/1996 | Dunn et al. |
| 5,584,937 A | 12/1996 | Finocchiaro |
| 5,593,503 A | 1/1997 | Shi et al. |
| 5,629,041 A | 5/1997 | Laaman et al. |
| 5,706,603 A | 1/1998 | Berquist et al. |
| 5,714,600 A | 2/1998 | McNaught et al. |
| 5,759,581 A | 6/1998 | Baensch et al. |
| 5,849,090 A | 12/1998 | Haralampu et al. |
| 5,855,946 A | 1/1999 | Seib et al. |
| 5,900,066 A | 5/1999 | Stute |
| 5,902,410 A | 5/1999 | Chiu et al. |
| 5,928,707 A | 7/1999 | Mahr et al. |
| 5,939,127 A | 8/1999 | Abboud |
| 5,952,033 A | 9/1999 | Anantharaman et al. |
| 5,962,047 A | 10/1999 | Griss et al. |
| 5,976,600 A | 11/1999 | Ruszkay et al. |
| 5,977,454 A | 11/1999 | McNaught et al. |
| 6,013,299 A | 1/2000 | Haynes et al. |
| 6,043,229 A | 3/2000 | Kettlitz et al. |
| 6,090,594 A | 7/2000 | Kettlitz et al. |
| 6,149,965 A | 11/2000 | van Lengerich et al. |
| 6,156,365 A | 12/2000 | Liwwszyc |
| 6,299,907 B1 | 10/2001 | Seib et al. |
| 6,303,174 B1 | 10/2001 | McNaught et al. |
| 6,352,733 B1 | 3/2002 | Haynes et al. |
| 6,409,840 B1 | 6/2002 | McNaught et al. |
| 6,451,367 B1 | 9/2002 | McNaught et al. |
| 6,468,355 B1 | 10/2002 | Thompson et al. |
| 6,468,568 B1 | 10/2002 | Leusner et al. |
| 6,485,575 B2 | 11/2002 | Yuan |
| 6,613,373 B2 * | 9/2003 | Haynes et al. ............... 426/549 |
| 6,623,943 B2 | 9/2003 | Schmeidel et al. |
| 6,664,389 B1 | 12/2003 | Shi et al. |
| 6,716,462 B2 | 4/2004 | Prosise et al. |
| 6,808,733 B2 | 10/2004 | Barndt et al. |
| 6,855,361 B2 | 2/2005 | Rapp et al. |
| 6,974,894 B2 | 12/2005 | Cooke et al. |
| 7,531,199 B2 | 5/2009 | Haynes et al. |
| 7,648,723 B2 | 1/2010 | Zimeri et al. |
| 7,972,643 B2 | 7/2011 | Haynes et al. |
| 2003/0113429 A1 | 6/2003 | McNaught et al. |
| 2004/0013782 A1* | 1/2004 | Hander et al. ............... 426/560 |
| 2004/0047963 A1 | 3/2004 | Haynes et al. |
| 2004/0228957 A1 | 11/2004 | Schmidt |
| 2005/0186306 A1 | 8/2005 | Sonneveld et al. |
| 2006/0093720 A1 | 5/2006 | Tatz |
| 2008/0138472 A1 | 6/2008 | Alexandre |
| 2009/0211570 A1 | 8/2009 | Haynes et al. |

FOREIGN PATENT DOCUMENTS

| | | |
|---|---|---|
| EP | 0 443 788 | 8/1991 |
| EP | 0 506 166 | 9/1992 |
| EP | 1 088 032 | 4/2001 |
| EP | 1 139 794 | 9/2003 |
| GB | 549991 | 12/1942 |
| GB | 605912 | 8/1948 |
| JP | 1060346 | 3/1989 |
| JP | 7095863 | 4/1995 |
| JP | 2001231469 | 8/2001 |
| WO | 89/00819 | 2/1989 |
| WO | 90/15147 | 12/1990 |
| WO | 91/07106 | 5/1991 |
| WO | 93/21784 | 11/1993 |
| WO | 94/14342 | 7/1994 |
| WO | 96/00509 | 1/1996 |
| WO | 96/01571 | 1/1996 |
| WO | 96/22073 | 7/1996 |
| WO | 96/22110 | 7/1996 |
| WO | 98/04156 | 2/1998 |
| WO | 99/22606 | 5/1999 |
| WO | 00/15050 | 3/2000 |
| WO | 00/41576 | 7/2000 |
| WO | 03/065822 | 8/2003 |
| WO | 2004/103089 | 12/2004 |

OTHER PUBLICATIONS

Alexander—"Resistant starch—new ingredient for the food industry.", Starch Tech, 1995, 40(6), pp. 455-458.

Anon—"In flakes and fibres", Lebensmitteltechnik, 1995, 27(11), pp. 22-23.

Anon—"Joint research leads to a new generation of high fibre products", Confectionery Production, 1996, 62(8), p. 21.

Aoac, *J. Assoc. Anal. Chem.*, 68(2) p. 399 (1985).

Aoac, Official Methods of Analysis, *J. Assoc. Anal. Chem.* 15th ed. pp. 1105-1106 (1990).

(56) References Cited

OTHER PUBLICATIONS

Atwell et al., "The Terminology and Methodology Associated With Basic Starch Phenomena," *Cereal Foods World*, vol. 33, No. 3, pp. 306-311 (Mar. 1988).
Brown et al.—"The health potential of resistant starches in foods. An Australian perspective", Scandinavian-Journal-of-Nutrition, 2000, 44(2), pp. 53-58.
Brown et al.—"The use of high amylose maize starch in the preparation of nutritional foods", Food Australia, 2000, 52(1-2), pp. 22-26.
*Cereal Chem.*, vol. 56, No. 5, p. 477 (1979).
Croghan—"High-fibre extrusion success", Sterling Publications Limited, 1997, pp. 61-64.
Croghan—"Novelose, resistant starch: a novelty in the functional fibre sector.", National Starch & Chemical SA, 1995, 261, pp. 37-41.
Eerlingen, Formation, Structure and Properties of Enzyme Resistant Starch, Feb. 1994, 1-135.
El-Hady et al.—"Production of enriched corn extrudates.—$2^{nd}$ part: fibre enrichment", Getreide-Mehl-Und-Brot, 2000, 54(3), pp. 195-200.
FoodStarch.com—"Resistant Starches—Natural Hi-maize, The Vital Fiber", http://www.foodstarch.com/about/abo_resistant.asp, downloaded Nov. 2, 2004.
Gault et al., Les ethers-sels cellulosiques solubles des acides gras superieurs, *Academie des Sciences*, Jul. 9, 1923, 124-127.
Huang, New perspectives on starch and starch derivatives for snack applications, *Cereal Foods World*, Aug. 1995, 1-5.
Huang et al., "Flour Chlorination. II. Effects on Water Binding", E. Ceral Chemistry 59(6):500 and 503 (1982).
Huth et al.—"Functional properties of dietary fibre enriched extrudates from barley", Journal-of-Cereal-Science, 2000, 32(2), pp. 115-128.
Kobayashi, T., "Susceptibility of heat-moisture-treated starches to pancreatic alpha-amylase, and the formation of resistant starch by heat-moisture treatment," *Denpun-Kagaku*, 40 (3) 285-290 (1993).
Kwatra et al., (1992) Synthesis of Long Chain Fatty Acids Esterified onto Cellulose via the Vacuum-Acid Chloride Process, *Ind. Eng. Chem. Res.*, 31:2647-2651.
National Starch & Chemical UK—"Healthy Starch Innovations for Snacks and Cereals", Food-Tech-Europe, 1996, 3(2), pp. 46, 48-50.
Pomeranz (1988) Wheat: Chemistry and Technology, Chapter 5, vol. II, p. 333.
Ranhotra et al.—"Resistant starch. A new ingredient for use in processed foods." Technical Bulletin, American Institute of Baking, Research Dept., 1999, 21(8).

Sheppard et al., (1935) Some Properties of Cellulose Esters of Homologous Fatty Acids, *Journal of Phys. Chem.*, 39: 143-152.
Sokhey, et al.—"Application of supercritical fluid extrusion to cereal processing", Cereal-Foods-World, 1996, 41(1), pp. 29-34.
*Starch: Properties and Potential*, T.Galliard, ed., John Wiley & Sons, p. 17 (1987).
Technical Service Bulletin for NOVELOSE, National Starch and Chemical Company, 1994.
Thomas et al., (1991) Subchronic Oral Toxicity of Cellulose Acetate in Rats, *Fd. Chem. Toxic.*, 29: 453-458.
Total Dietary Fiber Assay Kit, Mar. 1993 Technical Bulletin No. TDFAB-2, pp. 1-8, Sigma Chemical Company (1993).
Tovar et al.,"Steam-Cooking and Dry Heating Produce Resistant Starch in Legumes," *J. Agric. Food Chem.* 44, pp. 2642-2645 (1996).
Tuley—"Snacks go healthy", Food Manufacture, 2000, 75(3), pp. 30-31.
Unlu, et al.—"Formation of Resistant Starch by Twin-Screw Extruder", Cereal-Chemistry; May-Jun. 1998, 75(3), pp. 346-350.
Vansteelandt et al., "Characterisation of Starch from Durum Wheat (*Triticum durum*)", Starch/Starke 51 (1999) p. 73, 76 and 77.
Brighenti, F., et al., "One Month Consumption of Ready-to-eat Breakfast Cereal Containing Inulin Markedly Lowers Serum Lipids in Normolipidemic Men," from: Proceedings of 7th FENS European Nutrition Conference, Vienna, 1995.
Brochure entitled "Innovate With Raftiline®," Orafti Active Food Ingredients, Nov. 1996.
Bullock et al., "Replacement of Simple Sugars in Cookie Dough", *Food Technology*, pp. 82-85, Jan. 1992.
Devereux et al., "Consumer Acceptabiltiy of Low Fat Foods Containing Inulin and Oligofructose", *Journal of Food Science*, vol. 68, No. 5, 2003, pp. 1850-1854.
Gallagher et al., "Use of response surface methodology to produce functional short dough biscuits", *Journal of Food Engineering*, pp. 229-231 (2003).
"Inulin-A 'Good-for-you' Fat Replacer, Texture Modifier," *Food Formulating*, p. 15, Feb. 1997.
Silva, R., "Use of Inulin as a Natural Texture Modifier," *Cereal Foods World*, Oct. 1996, vol. 41, No. 10, pp. 792-794.
Zoulias et al., "Effect of sugar replacement by polyols and acesulfame-K on properties of low-fat cookies", *J Sci Food Agric* 80, pp. 2049-2056 (2000).
Zoulias et al., "Effect of fat and sugar replacement on cookie properties", *J Sci Food Agric* 80, pp. 1637-1644 (2002).

* cited by examiner

PRODUCTION OF LOW CALORIE, EXTRUDED, EXPANDED FOODS HAVING A HIGH FIBER CONTENT

RELATED APPLICATIONS

The present application is a continuation application of U.S. application Ser. No. 12/631,587, filed Dec. 4, 2009, now U.S. Pat. No. 8,163,324, which is a divisional application of U.S. application Ser. No. 11/258,759 filed Oct. 26, 2005, now U.S. Pat. No. 7,648,723, the disclosures of which are each herein incorporated by reference in their entireties, and the priority of which are claimed under 35 U.S.C. §120.

FIELD OF THE INVENTION

This invention relates to the production of low calorie, extruded, directly expanded, foods such as ready-to-eat (RTE) cereal, and snacks having a high fiber content.

BACKGROUND OF THE INVENTION

In the mass production of expanded, extruded, starch-based foods such as ready-to-eat (RTE) cereals and snacks, extrusion cooking may be employed to achieve high production rates and desirable product attributes such as low bulk densities, uniform cell structure, crisp or crunchy textures, and in the case of RTE cereals, long bowl life. Fortification of extruded, expanded foods such as ready-to-eat (RTE) cereals and snacks with insoluble and soluble dietary fiber as a replacement for higher calorie starch-based components such as wheat flour may adversely affect extrusion functionality or extrudability of the formulation. For example, production rates may decrease, extruder surging may increase, or product attributes such as bulk density, cell structure, texture, taste, mouth-feel, and bowl life may suffer as a result of substituting dietary fiber for starch-based components such as wheat flour. Generally, dietary fiber has a substantially higher water holding capacity than starch-based components such as wheat flour. The dietary fiber absorbs large amounts of water which makes it more difficult to expand a snack or RTE formulation and to achieve low bulk densities, uniform cell structure, and crispiness comparable to a starch-based formulation which does not contain fortifying amounts of dietary fiber. Decreasing the amount of added water to achieve a lower bulk density increases dough viscosity which tends to result in higher extruder back pressures, and reduced throughput or production rates. Production rate problems and product attribute problems tend to increase as greater amounts of dietary fiber are used to replace the starch-based components such as wheat flour.

Dietary fiber fortification of expanded snacks and RTE cereals has generally been achieved with bran, or the outer, generally non-digestible outer coating of whole grains, such as wheat bran and corn bran as disclosed in U.S. Pat. Nos. 4,777,045 to Vanderveer et al, U.S. Pat. Nos. 4,756,921 and 4,837,112 each to Calandro et al, 5,169,662 to Spicer, and U.S. Pat. No. 5,176,936 to Creighton et al. However, according to U.S. Pat. No. 5,480,669, the addition of resistant starch to dough compositions that are intended to be cooker extruded will yield a fiber fortified food product that has increased expansion over food products that do not contain the resistant starch or that are fortified with other forms of dietary fiber, such as oat bran or wheat bran.

Enzyme-resistant starch (RS) is a fraction of starch not digested in the small intestine of healthy individuals. Certain types of resistant starch may be partially fermented by microflora in the large bowel. Resistant starch may be classified into four types. Physically inaccessible starch, which is locked in the plant cell, is classified as type I resistant starch. It can be found in foodstuffs with partially milled grains and seeds and legumes. Native granular starch found in uncooked ready-to-eat starch-containing foods, such as in bananas, is classified as type II resistant starch. Enzyme susceptibility of type II resistant starch is reduced by the high density and the partial crystallinity of the granular starch. Type I and type II resistant starches have low melting points and do not survive high temperature processing, such as extrusion.

Starch may be treated to obtain an indigestible starch fraction. Depending upon the type of treatment, a type III or a type IV resistant starch may be produced. In type IV resistant starch, the enzyme resistance is introduced by chemically or thermally modifying the starch. The modification may be the formation of glycosidic bonds, other than alpha-(1-4) or alpha-(1-6) bonds, by heat treatments. Formation of these other glycosidic bonds may reduce the availability of starch for amylolitic enzymes. In addition, the digestibility of starch may be reduced by cross-linking or the presence of various substituents such as hydroxypropyl groups. However, legal limitations by the U.S. Food and Drug Administration (FDA) have been placed upon the use of various chemically modified starches in foods.

An indigestible starch fraction that forms after certain heat-moisture treatments of the starch is a type III enzyme-resistant starch. Heat-moisture treatments of the starch create crystalline regions, without the formation of glycosidic bonds other than alpha-(1-4) or alpha-(1-6) bonds. The type III resistant starch is thermally very stable, which is highly advantageous for producing reduced-calorie extruded cereals provided it is not substantially adversely affected by medium to high shear conditions encountered during extrusion. If the crystal structure that provides enzyme resistance is destroyed or melts during extrusion, and if the crystal recrystallizes into a lower-melting form that is not enzyme resistant, then calorie reduction will not be achieved in the extruded product.

U.S. Pat. Nos. 6,013,299, 6,352,733, and 6,613,373, U.S. Patent Publication No. 2004/0047963, and International Patent Publication No. WO 99/22606, published May 14, 1999, each to Haynes et al. disclose a method for producing a starch-based composition comprising a type III, retrograded, enzyme-resistant starch which has a melting point of at least about 140° C. Haynes et al also disclose a flour substitute comprising substantially ungelatinized wheat flour and a gelatinized, starch-based bulking agent, which comprises at least about 25% by weight of an amylase-resistant starch type III, based upon the total starch content of the starch-based bulking agent. The resistant starch ingredient has a melting enthalpy of from about 0.5 Joules/g to about 4.0 Joules/g at a temperature of from about 130° C. to about 160° C. as determined by modulated differential scanning calorimetry (MDSC), and a water-holding capacity of less than 3 grams of water per gram of dry resistant starch ingredient. The resistant starch has a melting point or endothermic peak temperature of at least about 140° C. as determined by MDSC. The enzyme resistant starch type III, it is disclosed, may be used to produce a baked good such as a cracker, cookie or reduced calorie cookie where the resistant starch ingredient is substantially unaltered by baking. The food product of Haynes et al may be a bar-type product, extruded, sheeted and cut, or rotary molded.

The present invention provides a process for the mass production of extruded, directly expanded food products such as ready-to-eat (RTE) cereals and expanded snacks having a high dietary fiber content. The fortification of extruded, expanded foods such as ready-to-eat (RTE) cereals and snacks with dietary fiber as a replacement for higher calorie starch-based components such as wheat flour may be achieved with both high production rates and desirable product attributes comparable to those of the non-fiber fortified product. It has been found that use of a starch-based composition comprising an enzyme-resistant starch type III which has a melting point of at least about 140° C., as determined by differential scanning calorimetry (DSC), and a water holding capacity of less than 3 grams of water per gram of dry resistant starch ingredient provides unexpectedly superior extrusion functionality and extrudability compared to the use of other resistant starches in the production of extruded, directly expanded food products. The extruded, expanded food products, such as RTE cereals produced in accordance with the present invention exhibit excellent extrusion characteristics in terms of bulk density, moisture content, a crispy, crunchy texture, bowl life, and cell structure. The expanded products may be produced at unexpectedly high production rates using large amounts of resistant starch for large caloric reductions when compared to rates and caloric reductions using other resistant starches such as a type II or type IV resistant starches, or lower melting type III resistant starches, which tend to be destroyed under high temperature and high shear processing, such as extrusion.

SUMMARY OF THE INVENTION

In the production of a fiber fortified, expanded food product by extrusion cooking, high calorie flour components may be replaced with high amounts of a gelatinized, amylase resistant starch type III ingredient have a low water holding capacity and a high melting point without substantial loss of extrusion functionality and extrudability. Extruder surging and substantial deterioration of the resistant starch type III are avoided even at high production rates while achieving expanded products having a bulk density, moisture content, crispy, crunchy texture, uniform cell structure, taste, mouthfeel, and bowl life comparable to those of non-fiber fortified expanded products. In embodiments of the invention, the resistant starch ingredient or bulking agent may include at least 30% by weight of an amylase-resistant starch type III having a melting point with an endothermic peak temperature of at least about 140° C. (also referred to as "X-150" herein) as determined by modulated differential scanning calorimetry (MDSC), and the water-holding capacity of the starch-based bulking agent may be less than 3 grams water per gram of the starch-based bulking agent. An expanded food product such as a ready-to-eat (RTE) cereal or snack having a high resistant starch content may be produced by admixing water, at least one flour, and the gelatinized, starch based bulking agent to form a dough, extrusion cooking the dough, extruding the cooked dough through a die at a die temperature of at least about 100° C., preferably at least about 125° C., and a die pressure of at least about 150 psig, preferably at least about 250 psig, to substantially expand the cooked dough, and cutting the expanded and cooked dough into pieces. The total dietary fiber retention of the gelatinized, starch-based bulking agent may be at least about 90% by weight after the extrusion. High production rates may be used even when the bulking agent is employed in a preferred amount of at least about 50% by weight based upon the weight of the bulking agent and the at least one flour. Also, even when the bulking agent is employed in such high amounts, the expanded products may be produced with a bulk density of from about 0.25 g/cm³ to about 0.45 g/cm³, an average peak force brittleness of at least about 3000 grams, and an average peak distance brittleness of less than about 4 mm.

DETAILED DESCRIPTION OF THE INVENTION

Figure 1:
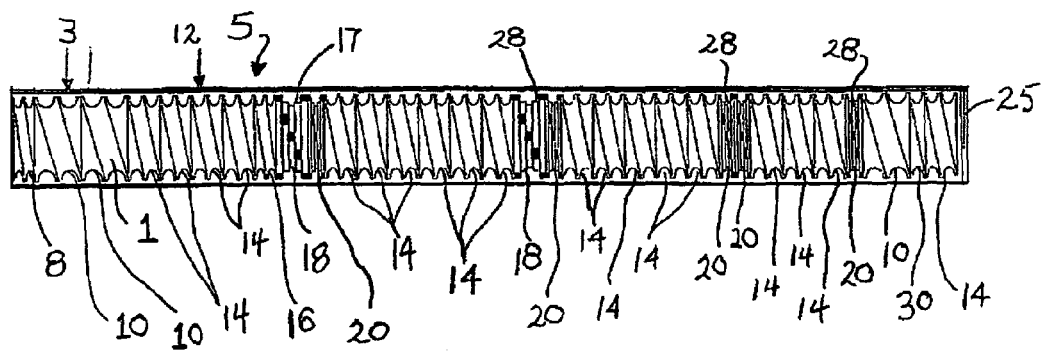
FIG. 1 is schematic diagram of a twin screw extruder having a medium-shear screw profile which may be employed in the production of expanded foods in accordance with the present invention.

The production of an extruded, directly expanded, high fiber reduced calorie food product, such as a ready-to-eat (RTE) cereal or sweet or savory snack, at high production rates without substantial loss of extrusion functionality and extrudability is achieved by replacing a substantial portion of at least one flour with a gelatinized, enzyme-resistant starch type III ingredient or bulking agent as a reduced-calorie, high fiber flour replacer. The flour replacer employed in the present invention includes a very-high melting, type III resistant starch, which is thermally very stable and which is also very stable under high shear conditions. This is highly advantageous for producing reduced-calorie extruded cereals and snacks, because if the crystal structure that provides enzyme resistance is destroyed by medium to high shear or melts during extrusion, and if the crystal recrystallizes into a lower-melting form which is not enzyme resistant, then calorie reduction will not be achieved in the extruded product. Thus, the present invention employs a very high-melting, high-shear-surviving resistant starch type III ingredient which has been found to be substantially unaltered by extrusion. In embodiments of the present invention, the total dietary fiber retention of the gelatinized, starch-based bulking agent is at least about 90% by weight after extrusion cooking under at least medium shear extrusion conditions.

The high melting enzyme-resistant starch type III (also referred to as RS III), employed in the present invention has a melting point with an endothermic peak temperature of at least about 140° C., preferably at least about 145° C., most preferably at least about 150° C., as determined by modulated differential scanning calorimetry (MDSC). The high melting enzyme-resistant starch type III employed in the present invention is also referred to herein as "X-150". Also, the resistant starch type III ingredient or bulking agent which contains the enzyme-resistant starch type III has a melting point with an endothermic peak temperature of at least about 140° C., preferably at least about 145° C., most preferably at least about 150° C., as determined by modulated differential scanning calorimetry (MDSC) with essentially no other peaks occurring down to 50° C. indicating the substantial absence of amylose-lipid complexes as well as the substantial absence of other crystalline forms of starch.

Also, the resistant starch type III ingredient or bulking agent employed in the present invention has a low water holding capacity which makes more added water available for expansion of the extruded dough, helps to reduce dough viscosity and extruder back pressure, and increases extruder throughput or mass production rates. The low water holding capacity avoids the absorption of large amounts of water which would make it more difficult to expand a snack or RTE formulation. Use of a low water holding capacity resistant starch type III ingredient in accordance with the present invention permits the attainment of a low bulk density, uniform cell structure, and crispiness comparable to a starch-based formulation which does not contain fortifying amounts of dietary fiber. Large amounts, preferably at least about 50% by weight of one or more flours or other starch-based components may be replaced with the resistant starch type III ingredient without production rate problems and without product attribute problems such as excessively high bulk density, loss of crispiness, short bowl life, and non-uniform cell structure.

In embodiments of the invention, the resistant starch type III ingredient or bulking agent may have a water holding capacity of less than 3 grams of water per gram of dry matter or the dry starch-based bulking agent. In preferred embodiments, the water holding capacity of the resistant starch type III ingredient or gelatinized, enzyme-resistant bulking agent or flour substitute or replacer may approach that of conventional ungelatinized wheat flour, which may be about 0.6 grams of water per gram of dry flour, so as to achieve production rates and product attributes such as bulk density, crispiness, long bowl life, and uniform cell structure comparable to expanded products produced with wheat flour in the absence of added dietary fiber. Exemplary water holding capacities for the resistant starch type III ingredient or bulking agent are less than about 250% by weight, and preferably range from about 100% by weight to about 200% by weight (e.g., 1.0 gram water/gram dry resistant starch type III ingredient to 2.0 grams water/gram dry resistant starch type III ingredient).

In embodiments of the invention, the high fiber, low calorie, extruded, expanded food products may have a bulk density of from about 0.25 g/cm$^3$ to about 0.45 g/cm3, an least substantially uniform cell structure, long bowl lives, and a crispy, crunchy texture with an average peak force brittleness of at least about 3000 grams, and an average peak distance brittleness of less than about 4 mm.

An enzyme resistant starch type III, a gelatinized bulking agent or resistant starch type III ingredient containing the resistant starch, and a flour substitute containing the bulking agent which may be employed in the present invention, and their methods of production are disclosed in U.S. Pat. Nos. 6,013,299, 6,352,733, and 6,613,373, U.S. Patent Publication No. 2004/0047963, and International Patent Publication No. WO 99/22606, published May 14, 1999, each to Haynes et al, each of which are incorporated herein by reference in their entireties. As disclosed by Haynes et al, a high-melting-point, enzyme-resistant starch type III or RS III having a melting point or endothermic peak temperature of at least about 140° C., preferably at least about 145° C., most preferably at least about 150° C., as determined by modulated differential scanning calorimetry (MDSC) may be obtained in high yield by using a nucleating temperature above the melting point of amylopectin crystals. The enzyme-resistant starch type III compositions generally melt within a temperature range of about 130° C. to about 160° C. and have an endothermic peak temperature or melting point of at least about 140° C. Essentially no other peaks occur down to 50° C. or below, but a small peak may be present, indicating the presence of a small amount of amylose-lipid complexes. The RS III is nucleated from a gelatinized starch composition which is at least substantially free of amylopectin crystals and amylose-lipid complexes, so as to increase the yield of RS type III. Yields of RS type III may be at least about 25% by weight, preferably at least about 30% by weight, most preferably at least about 35% by weight, based upon the weight of the original or starting starch ingredient. The yields are determined by the more stringent Prosky fiber analysis.

The enzyme-resistant starch type III produced in the Haynes et al process and which is used in the present invention is resistant to enzymes such as α-amylase, β-amylase, amyloglucosidase, and pancreatin and provides a reduced-calorie or low-calorie, highly functional ingredient for expanded extruded food products as well as baked goods.

The starches used in preparing the enzyme-resistant starch, as disclosed by Haynes et al may be derived from any source. Exemplary of starches which may be employed are corn, potato, sweet potato, wheat, rice, sago, tapioca, waxy maize, sorghum, legume starch, brewer's spent grain, and mixtures thereof. Examples of legume starches which may be employed are pea starches, such as wrinkled pea or smooth pea starch, faba bean, mung bean, red kidney bean, and lentil bean starch. The starch may be defatted or chemically modified, for example, converted, derivatized, or crosslinked, and still yield resistant starch. The starch may also be partially or completely pre gelatinized. However, commercially available pregelatinized starches may be gelatinized at temperatures which melt or destroy crystals of naturally present resistant starch type III. Accordingly, it is generally preferable to use raw starches as starting starches.

Starches which have high contents of amylose or high contents of amylopectins which have long, straight branch chains are preferred. The long, straight branch chains of the amylopectins function as amylose, in terms of crystallization, and analyze as amylose by the iodine test. The starting starch preferably has a high content of straight chains, to provide a resistant starch having crystalline chains of at least about 20 glucose units, preferably at least about 100 glucose units, derived from amylose and/or from amylopectin.

Preferred as a starting starch in the Haynes et al process and which may be used for making a RS III for use in the present invention is a starch containing greater than 40% amylose, preferably at least about 50% amylose, most preferably at least about 60% by weight amylose, based upon the total weight of amylose and amylopectin. The starting starch also preferably has a low lipid content, for example less than about 0.1% by weight, preferably less than about 0.05% by weight so as to avoid the production of undesirable amylose-lipid complexes. Examples of preferred starting starches are amylomaize starch and wrinkled pea starch, because of their high amylose contents or high apparent amylose contents. Amylomaize may have an amylose content of about 52% by weight to about 80% by weight and a lipid content of about 0.09% by weight. The amylose content of wrinkled pea starch may be from about 63% by weight to about 75% by weight. In addition, the lipid content of wrinkled pea starch is only about 0.01% by weight, which is advantageous for avoiding the formation of amylose-lipid complexes. Commercially available high amylose-content starches which may be used as the starting starch in the processes of Haynes et al and which may be used in making a RS III for use in the present invention are HYLON V, a corn starch containing about 50% amylose, or HYLON VII, a corn starch containing about 70% amylose, both products of National Starch and Chemical Company, Bridgewater, N.J.

As disclosed in Haynes et al, the very-high-melting, enzyme-resistant starch (RS III) is produced in high yield, as determined by the more stringent Prosky method for the determination of dietary fiber. High yields of the enzyme-resistant starch may be achieved on a continuous, consistent basis using relatively short crystal-nucleation and crystal-propagation times. High yields of the enzyme-resistant starch are achieved using processing conditions which avoid substantial discoloration or the production of components which impart offensive odors to the product. In addition, the production of lower-melting-point amylopectin crystals, lower-melting-point amylose crystals, and lower-melting-point amylose-lipid complexes, all of which tend to reduce yield of the high-melting resistant starch type III crystals, is substantially avoided in the process of Haynes et al.

In accordance with the method of Haynes et al, in a first stage of the process for making the RS III, a starch ingredient is heated in the presence of water to at least substantially, preferably completely, gelatinize the starch. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306-311 (March 1988). In embodiments of the present invention, the starch granules of the pregelatinized starches in the resistant starch type III ingredient or bulking agent or flour replacer, and the starch of the extruded, expanded food products may be at least about 90% gelatinized, preferably at least about 95% gelatinized, most preferably completely gelatinized.

The gelatinization of the starch ingredient in the first stage of the Haynes et al process for making the RS III is conducted at a temperature above the melting point of any amylose-lipid complex which may be present in the starch ingredient, but below the melting point of the enzyme-resistant starch Type III. In preferred embodiments, the starch is pasted as well as gelatinized. Exemplary starch-gelatinization temperatures which may be employed may range from about 110° C. to about 130° C. with pressures from about 1.05 kg/cm$^2$ to about 21 kg/cm$^2$ (about 15 psi to about 30 psi). The weight ratio of starch to water may range from about 0.15:1 to about 1:1, preferably from about 0.4:1 to about 0.7:1, during gelatinization as well as during the subsequent nucleation and propagation steps.

A second stage of the process involves at least one cycle of crystal nucleation and propagation. In a critical cooling step, the gelatinized starch is cooled to a crystal nucleating temperature above the melting point of amylopectin starch to prevent the amylopectin from nucleating and propagating. The nucleating temperature employed is also preferably not favorable to nucleation of any amylose-lipid complex which may have been present in the starch ingredient. By not cooling below the melting point of amylopectin, nucleation and growth of amylopectin crystals, which are believed to compete with or impede the nucleation and growth of high-melting amylose crystals, is avoided. Exemplary nucleating temperatures range from about 55° C. to about 100° C., preferably from about 60° C. to about 80° C. The gelatinized starch is maintained at the nucleating temperature for a period of time sufficient to nucleate a substantial amount of crystals of the high-melting point, enzyme-resistant starch. Exemplary nucleation times range from about 0.5 hours to about 3 hours, generally about 1 hour. Longer nucleation times, for example up to about 24 hours, may be used but do not substantially increase yields. The rate of cooling of the gelatinized starch to the nucleating temperature should be as fast as possible and may be at least about 1° C./min, preferably at least about 3° C./min, most preferably at least about 4° C./min.

After maintaining the gelatinized starch at the nucleating temperature, the temperature of the gelatinized starch is raised above the melting point of any amylose-lipid complexes, to a crystal-propagating temperature which is below the melting point of the desired enzyme-resistant starch. Thus, any amylose-lipid complex which may have been formed during nucleation would be remelted during propagation or growth of the enzyme-resistant starch crystals. The temperature may be raised from the nucleating temperature to the crystal-propagating temperature at a rate of from at least about 1° C./min, preferably at least about 3° C./min, most preferably at least about 4° C./min to avoid any substantial propagation of undesirable crystals, such as amylose-lipid complexes. Exemplary crystal-propagating temperatures for growing crystals of the enzyme-resistant starch may range from about 115° C. to about 135° C., preferably from about 120° C. to about 130° C. Exemplary times for maintaining the temperature at the crystal-propagating temperature are generally less than about 12 hours, preferably less than about 5 hours, most preferably from about 0.5 to about 3 hours.

The steps of cooling the gelatinized starch, maintaining the gelatinized starch at the nucleating temperature, raising the temperature of the gelatinized starch to a crystal-propagating temperature, and maintaining the temperature at the crystal-propagating temperature to grow crystals may be sequentially performed in at least one cycle, preferably from two to four cycles, to increase yields of the high-melting enzyme-resistant starch. In embodiments of the Haynes et al invention, up to about 10 to 12 cycles may be utilized.

After the last step of crystal propagation, the gelatinized starch may be cooled to about room temperature, or about 20° C. to about 50° C. and then dried. Exemplary cooling rates may be at least about 1° C./min on average, preferably at least about 3° C./min on average, most preferably at least about 4° C./min on average. The drying may be performed at room temperature or at elevated temperatures. Thus, the gelatinized starch may be cooled from the crystal-propagating temperature to room temperature or to a drying temperature which is above room temperature. Exemplary drying temperatures may range from about 20° C. to about 130° C., depending on mode of drying, preferably from about 75° C. to about 85° C., e.g. about 80° C., for oven-drying.

The temperature cycling increases yield and achieves high calorie reduction, without the need to isolate the high-melting enzyme-resistant starch type III. The drying of the high-melting-point resistant starch type III composition is conducted to achieve a shelf-stable water activity or relative humidity of less than about 0.7. The water content of the dried product may approximate that of commercially available flour. Exemplary moisture contents of the dried, bulking agent or flour substitute or replacer may range from about 8% by weight to about 14% by weight. The dried composition may be used as a bulking agent, or flour substitute or replacer, thereby avoiding crystal solids losses and increased costs associated with isolation of the high-melting resistant starch type III.

In embodiments of the Haynes et al invention, a debranching enzyme such as pullulanase may be used to increase the yield of the high-melting enzyme-resistant starch type III. The debranching may occur prior to, or preferably after, a substantial amount of high-melting enzyme-resistant starch type III has been propagated.

In other embodiments of the Haynes et al process, seed crystals of the high-melting enzyme-resistant starch type III may be admixed with the gelatinized starch above the melting point of amylopectin crystals and above the melting point of any amylose-lipid complexes, but below the melting point of the high-melting enzyme-resistant starch, to nucleate crystals of the enzyme-resistant starch type III.

In preferred embodiments of the Haynes et al process, a third stage may be conducted, involving heat treatment of the enzyme-resistant starch type III product obtained from the second-stage nucleation/propagation temperature cycling which substantially improves the baking characteristics or baking functionality of the second-stage product. Enzyme resistant starch type III which is obtained by the heat treatment process of Haynes et al is preferred for use in producing the extruded expanded food products of the present invention. The RS III obtained using the heat treatment has been found by the present inventors to provide excellent extrusion functionality and extrudability in the production of expanded foods. As disclosed in Haynes et al the heat treatment substantially increases the amount or yield of enzyme-resistant starch or total dietary fiber. The higher enzyme-resistant starch content or dietary fiber content is achieved, without substantially adversely affecting the content of enzyme-resistant starch type III which melts at a temperature of at least about 140° C. The heat-treatment in the presence of water is believed to result in densification of the amorphous regions of the starch thereby making those regions less accessible to enzymes. The reduced accessibility increases the amount of enzyme resistant starch or total dietary fiber. However, no change in the enthalpy is interpreted to mean that the heat-treatment increases the amount of enzyme resistant starch which is not crystalline.

The heat treatment, as disclosed by Haynes et al may be conducted at a temperature of from about 100° C. to about 140° C., preferably from about 125° C. to about 135° C., most preferably from about 128° C. to about 132° C. Heat-treatment times may range from about 5 minutes to about 6 hours, preferably from about 30 minutes to about 90 minutes, most preferably from about 50 minutes to about 70 minutes. The moisture content of the enzyme-resistant starch during heat treatment may be from about 1% by weight to about 30% by weight, preferably from about 14% by weight to about 24% by weight, most preferably from about 16% by weight to about 20% by weight.

The non-purified resistant starch type III ingredient or bulking agent obtained by the process of Haynes et al and which may be used in the present invention comprises at least about 25% by weight, preferably at least 30% by weight, most preferably at least 45% by weight of enzyme resistant starch type III as determined by the stringent Prosky method. The balance of the product comprises gelatinized, amorphous, or non-crystallized starch. In preferred embodiments, it is at least substantially free, most preferably essentially or completely free of amylose-lipid complexes and other crystallized starch products having a melting point below that of resistant starch III.

The water holding capacity of the resistant starch type III ingredient of Haynes et al which may be used in the present invention is less than 3 grams of water per gram of dry matter, depending upon the yield of resistant starch type III and the quality of the crystals. Generally, the fewer the amorphous regions and the greater the crystalline regions, the less is the ability of the resistant starch ingredient to bind or hold water. The lower water holding capacities generally result in a lower viscosity dough and a beneficial effect upon extrusion rates, and expanded product attributes such as bulk density and crispiness.

Enthalpy values for the isolated high-melting enzyme-resistant starch disclosed by Haynes et al and which may be used in the present invention may range from greater than about 5 J/g, preferably from about 8 J/g to about 15 J/g depending upon the perfection of the crystals or the number of amorphous regions or sections in the crystal. Generally, higher enthalpy values indicate, that there are fewer amorphous regions, and the water holding capacity is lower. The enthalpy of the enzyme resistant bulking agent or ingredient, or flour substitute, at a temperature within the range of about 130° C. to about 160° C., used in the present invention may range from about 0.5 J/g to about 4 J/g, preferably from about 1 J/g to about 3 J/g, most preferably about 2.5 J/g, based upon the weight of the bulking agent or ingredient, or flour substitute. After extrusion, enthalpy values of the enzyme-resistant bulking agent or ingredient, or flour substitute in the expanded, extruded food product, such as a ready-to-eat cereal may range from about 0.5 J/g to about 4 J/g, for example about 3.2 J/g, preferably from about 1 J/g to about 3 J/g, most preferably about 2.5 J/g, at a temperature within the range of about 130° C. to 160° C., based upon the weight or content of the bulking agent or flour substitute employed in the formula. The enthalpy values of the bulking agent or resistant starch type III ingredient, or flour substitute after extrusion are preferably at least substantially the same as, or essentially the same as the enthalpy values of the bulking agent or ingredient, or flour substitute prior to extrusion.

The enzyme resistance and low caloric value of the very high melting enzyme resistant starch type III ingredient or component is substantially unaltered by extrusion cooking under medium to high shear conditions and elevated temperatures and pressures which are sufficient to substantially expand the cereal or snack dough upon exiting the extruder die. The RS type III ingredient or bulking agent remains substantially enzyme resistant and exhibits a reduced calorie value. The pure, or 100% by weight (100% yield) enzyme resistant starch type III (having a melting point or endothermic peak of at least 140° C., preferably at least 145° C., most preferably at least 150° C., as determined by MDSC) has a calorific value of essentially zero, or less than about 0.5 calories/gram, even after extrusion cooking and expansion. The calorific value for starch which is not resistant starch type III is about 4 calories/gram. (Although technically calorific values are in kcal/gm, they are discussed herein in terms of the commonly used units of calories/gram.) Thus, in embodiments of the invention a resistant starch type III ingredient or bulking agent with at least a 30% yield of RS type III (having a melting point or endothermic peak temperature of at least 140° C., preferably at least 145° C., most preferably at least 150° C., as determined by MDSC) will exhibit a calorific value of less than about 2.8 calories/gram (0.7×4 cal/g+0.3×0 cal/g=2.8 cal/g), even after the extrusion cooking and expansion. In preferred embodiments, a resistant starch type III ingredient or bulking agent with a 60% to 50% yield of RS type III (having a melting point or endothermic peak temperature of at least 140° C., preferably at least 145° C., most preferably at least 150° C., as determined by MDSC) will exhibit a calorific value of about 1.6 to 2.0 calories/gram (0.4×4 cal/g+0.6×0 cal/g=1.6 cal/g, and 0.5×4 cal/g+0.5×0 cal/g=2.0 cal/g), even after extrusion cooking and expansion.

The yield or amount of RS type III is determined by fiber analysis. Several methods are available for the in vitro determination of resistant starch. In the Prosky method (AOAC, method 991.43, J. Assoc. Anal. Chem., 68(2), pp. 399 (1985) and AOAC, Official Methods of Analysis, J. Assoc. Anal. Chem., 15th ed., pp. 1105-1106 (1990)), a fiber fraction is isolated in the starch samples after incubation with different enzymes, such as a heat-stable alpha-amylase at 100° C. In this residue, RS is determined as the starch available for amyloglucosidase digestion at 60° C., only after solubilization with 2N potassium hydroxide. The resistant-starch yields in the Prosky method are lower than other methods used, since it is more severe. When using incubation temperatures of 100° C., the starch is gelatinized and RS type II is not quantified. Additionally, retrograded amylopectin, which exhibits a melting temperature of about 50° C., and amylose-lipid complexes, with melting temperatures in the range of 90° C.-110° C., are easily hydrolyzed when incubated with a heat-stable alpha-amylase at 100° C.

Even though the resistant starch type III ingredient or bulking agent contains high amounts of gelatinized starch, it exhibits excellent extrusion functionality and extrudability in terms of extruder throughput or production rates, and expanded product attributes such as bulk density, crispiness, bowl life, taste, and uniform cell structure. It may be used alone or preferably in combination with non-gelatinized, or substantially ungelatinized flour to obtain doughs for the production of reduced calorie extruded, expanded foods such as reduced calorie ready-to-eat cereals, and reduced calorie savory and sweet snacks.

In embodiments of the present invention, substantial calorie reduction in expanded, extruded food products may be achieved by replacing a substantial amount of at least one conventional, non-gelatinized, flour with the resistant starch type III ingredient or bulking agent. Flour substitutes comprising substantially ungelatinized flour (non-calorie reduced flour) and calorie reducing amounts of the gelatinized, starch-based bulking agent (reduced calorie flour replacer), such as disclosed in Haynes et at may be employed in the present invention. The flour substitute may be combined with RTE cereal and snack ingredients to provide doughs which exhibit excellent extrusion functionality and extrudability in medium shear to high shear cooker extruders. In embodiments of the invention, the flour substitute employed may have a calorie reduction of at least about 12.5%, preferably at least about 15%, most preferably at least about 25%, for example about 35% to about 40% by weight, compared to a conventional, non-calorie reduced flour. The flour substitute may be used with other reduced calorie bulking agents or sugar substitutes, such as polydextrose, to obtain doughs for producing reduced calorie extruded, expanded RTE cereals and reduced calorie extruded expanded snacks having a calorie reduction of at least about 25%.

The flour substitutes and doughs of the present invention may comprise at least about 12.5% by weight, preferably at least about 15% by weight, most preferably at least about 25% by weight, for example about 35% by weight to about 40% by weight, of enzyme resistant starch type III having a melting point or endothermic peak temperature of at least about 140° C., the weight percentage being based upon the total starch content of the flour substitute or dough, respectively.

The flour component or farinaceous materials which may be combined with the resistant starch type III ingredient or bulking agent in producing the flour substitutes and doughs employed in the present invention may be any comminuted cereal grain or edible seed or vegetable meal, derivatives thereof and mixtures thereof. Exemplary of the flour component or farinaceous materials which may be used are wheat flour, corn flour, corn masa flour, oat flour, barley flour, rye flour, rice flour, potato flour, grain sorghum flour, tapioca flour, graham flour, or starches, such as corn starch, wheat starch, rice starch, potato starch, tapioca starch, physically and/or chemically modified flours or starches, such as pregelatinized starches, and mixtures thereof. The flour may be bleached or unbleached. Wheat flour or mixtures of wheat flour with other grain flours are preferred.

The amount of gelatinized starch-based bulking agent, or the RS III ingredient, may generally be at least about 25% by weight, for example at least about 40% by weight, preferably greater than 45% by weight, most preferably from about 50% by weight to about 75% by weight, based upon the total weight of the gelatinized bulking agent and the flour component, such as conventional, ungelatinized wheat flour.

The total amount of the flour component and the RS III bulking agent used in the compositions of the present invention may range, for example, from about 30% by weight to about 95% by weight, preferably from about 50% by weight to about 90% by weight, for example from about 70% by weight to about 85% by weight, based upon the weight of the dough. Unless otherwise indicated, all weight percentages are based upon the total weight of all ingredients forming the doughs or formulations of the present invention, except for inclusions such as flavor chips, nuts, raisins, and the like. Thus, "the weight of the dough" does not include the weight of inclusions.

The flour component may be replaced in whole or in part by conventional flour substitutes or bulking agents, such as polydextrose, hollocellulose, microcrystalline cellulose, mixtures thereof, and the like. Corn bran, wheat bran, oat bran, rice bran, mixtures thereof, and the like may also be substituted in whole or in part for the flour component to enhance color, or to affect texture.

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be employed.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments of the present invention, the total sugar solids content, or the texturizing ingredient content, of the doughs of the present invention may range from zero up to about 50% by weight, based upon the weight of the dough.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making the reduced calorie baked goods of the present invention. Exemplary replacement amounts may be at least about 25% by weight, for example at least about 40% by weight, preferably from about 50% by weight to about 75% by weight, of the original sugar solids content.

In embodiments of the invention, the amount of the conventional sugar substitute, conventional bulking agent, or conventional flour substitute, preferably polydextrose, may be from about 10% by weight to about 35% by weight, preferably from about 15% by weight to about 25% by weight, based upon the weight of the dough.

The moisture contents of the doughs of the present invention should be sufficient to provide the desired consistency to enable proper forming, machining, and cutting of the dough. The total moisture content of the doughs of the present invention will include any water included as a separately added ingredient, as well as the moisture provided by flour (which usually contains about 12% to about 14% by weight moisture), the moisture content of the RS III ingredient, and the moisture content of other dough additives included in the formulation, such as high fructose corn syrup, invert syrups, or other liquid humectants.

Taking into account all sources of moisture in the dough, including separately added water, the total moisture content of the doughs of the present invention is generally less than about 30% by weight, preferably less than about 20% by weight, based upon the weight of the dough. The amount of added water is generally in the amount of about 2% to 15% by weight, preferably from about 5% by weight to about 10% by weight, based upon the total weight of the dry ingredients or powder feed which is fed to the extrusion cooker.

Oleaginous compositions which may be used to obtain the doughs and extruded, expanded food products of the present invention may include any known shortening or fat blends or compositions useful for cooking or baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise soybean oil.

Extruded, expanded food products which may be produced in accordance with the present invention include reduced calorie food products which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving.

In addition to the foregoing, the doughs of the invention may include other additives conventionally employed in extruded, expanded food products such as ready-to-eat cereals, sweet snacks, and savory snacks. Such additives may include, for example, vitamins, minerals, milk by-products, egg or egg by-products, cocoa, vanilla or other flavorings, natural or artificial fruit flavors, spices such as cinnamon and/or nutmeg, honey flavoring, dry honey, almond flavoring, and maple flavoring, as well as inclusions such as nuts, raisins, and coconut, and the like in conventional amounts.

A source of protein, which is suitable for inclusion in expanded ready-to-eat cereals and snacks, may be included in the doughs of the present invention to promote Maillard browning or to provide protein fortification. The source of protein may include non-fat dry milk solids, dried or powdered eggs, mixtures thereof, and the like. The amount of the proteinaceous source may, for example, range up to about 5% by weight, based upon the weight of the dough.

The dough compositions of the present invention may contain up to about 5% by weight of a leavening system, based upon the weight of the dough. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, trisodium phosphate dodecahydrate, mixtures thereof, and the like. Yeast may be used alone or in combination with chemical leavening agents.

The doughs of the present invention may include antimycotics or preservatives, such as calcium propionate, potassium sorbate, sorbic acid, and the like. Exemplary amounts may range up to about 1% by weight of the dough, to assure microbial shelf-stability.

Emulsifiers may be included in effective, emulsifying amounts in the doughs of the present invention. Exemplary emulsifiers which may be used include, mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough.

Production of the doughs of the present invention may be performed using conventional dough mixing techniques and equipment used in the production of extruded, expanded foods such as ready-to-eat breakfast cereals, and extruded, expanded snacks. For example, the doughs may be extrusion cooked and extruded through extrusion dies using conventional single or twin cooker extruders. The extruders may be equipped with conventional medium to high shear screw configurations for at least substantially homogeneously admixing and heating the dry ingredients and added water to obtain a cooked dough and then extruding the cooked dough through one or more apertures of a conventional extrusion die employed for the production of expanded snacks and cereals. In embodiments of the invention where medium to high shear conditions are employed, the specific mechanical input during admixing and heating of the ingredients to obtain a formable mixture or dough may be greater than 150 Wh/kg. The resistant starch type III ingredient may be preblended with the one or more flour components to obtain a substantially homogeneous mixture for mixing with the other dough ingredients.

In embodiments of the invention, a dough comprising all ingredients may be made using conventional batch or continuous mixers. Subsequently, the dough, which may be a crumbly dough may be fed into a single screw extruder. The single screw extruder presses the dough against a die plate and plasticizes the crumbs into a continuous dough phase which may then be pressed through an extrusion die and subsequently cut into individual particulates.

In other embodiments of the invention, the dough can be made in a conventional batch mixer or continuously using a continuous mixer or extruder alone without substantial heating of the ingredients. The dough may then be fed to a cooker extruder for cooking and extrusion. In preferred embodiments, the dry ingredients and the wet ingredients are separately fed to a cooker extruder for admixing and heating of the ingredients to obtain a cooked or at least substantially gelatinized dough which is extruded through the die plate of the cooker extruder. Single or twin screw cooker extruders are advantageously used which enable the steps of continuously mixing and cooking the dough and subsequently extruding the dough through an extrusion die plate. Co-rotating intermeshing twin screw extruders, such as those available from Buhler, Switzerland, Clextral France, Werner and Pfleiderer Germany, APV England or Wenger USA, or a Co-Kneader, available from Buss, Switzerland may be employed in embodiments of the invention. The cooker extruder employed may have a plurality of separately temperature controlled barrel sections, such as 4 to 8 barrel sections. For example, a Werner & Pfleiderer ZSK 25 MC twin-screw cooker extruder with six temperature controlled barrel sections, a medium shear screw profile, and a ¼ inch 2-strand die may be employed in the present invention for producing expanded ready-to-eat cereals and snacks.

In accordance with the method of the present invention, an at least substantially homogenous preblend of the dry ingredients and the added wet ingredients, such as water, may be admixed and heated to plasticize the at least one flour component and the resistant starch ingredient type III or flour substitute under at least low shear mixing conditions, preferably medium shear mixing conditions without substantially destroying or decomposing resistant starch ingredient type III or flour substitute. In preferred embodiments, the dry ingredients and the wet ingredients or plasticizer may be added to the upstream end of the cooker extruder, mixed and heated above the gelatinization temperature of starch, but at or below the melting point or endothermic peak temperature of the resistant starch type III while mixing and conveying these ingredients inside the extruder. While higher temperatures may be employed for short residence times, it is preferable to employ temperatures which substantially or essentially completely avoid melting of the crystals which may result in loss of total dietary fiber content as measured by the Proskey method. In embodiments of the invention, the starch is at least partially gelatinized without substantially destructurizing and dextrinizing the starch. The degree of gelatinization may, for example, be at least about 75%, for example, at least about 90%, or essentially completely gelatinized.

In embodiments of the invention, to achieve at least substantial gelatinization of starch, the starch and plasticizer (preferably water) admixture may be maintained at an extrusion cooking temperature of the blend of at least about 100° C., preferably from about 120° C. to about 150° C., for example, from about 125° C. to about 140° C., for a period of time of at least about 2 l/d preferably from about 3 l/d to about 5 l/d of extruder length. For example, for starches having an amylose content of more than about 25%, for example about 50% to about 70%, it may be necessary to maintain a product temperature inside the extruder of about 125° C. for a sufficient amount of time, preferably from about 3 l/d to about 5 l/d, for example about 3 l/d, of extruder length at a low screw rotational rate of about 150 to about 200 rpm using medium pitch screw elements to assure at least substantial gelatinization of the starch.

In embodiments of the invention, exemplary screw speeds may range from about 75 to about 275 rpm, preferably from about 175 rpm to about 225 rpm. Higher rpm tend to introduce more shear, dextrinize and destructurize starch to a larger extent. Low screw speeds (rpm's) also increase the degree of fill and thus heat transfer capability, i.e. heating and cooling. In embodiments of the invention, the generated torque may range from about 40% to about 60%.

In embodiments of the invention, the pressure maintained within the cooking section or gelatinization section or plastification zone may be between about 5 to 100 bars, preferably between about 10 and 50 bars.

An overall quantitative measure of the shear used inside the extruder during the cooking process is the specific mechanical energy input. In low shear mixing embodiments of the present invention, the specific mechanical input during cooking may be below about 0.120 kWh/kg. In medium shear mixing embodiments of the present invention, the specific mechanical input during cooking may be from about 0.12 kWh/kg to about 0.24 kWh/kg, preferably from about 0.15 kWh/kg to about 0.20 kWh/kg, most preferably from about 0.16 kWh/kg to about 18 kWh/kg. In high shear mixing embodiments of the present invention, the specific mechanical input during cooking may be greater than about 0.24 kWh/kg, for example from 0.25 kWh/kg to about 0.35 kWh/ kg, or higher. In preferred embodiments the specific mechanical input during cooking is less than about 0.24 kWh/kg, preferably below about 0.20 kWh/kg, and most preferably below about 0.18 kWh/kg. Most preferably, medium shear mixing during cooking is employed in the present invention.

The admixing of the ingredients inside the extruder may be accomplished by using an appropriate extrusion screw configuration for achieving low shear or medium shear mixing. For example, a combination of alternating small pitch conveying elements with distributive mixing elements, that are staggered at an angle to each other for providing axially oriented leakage flow inside the extruder barrel may be employed for low shear mixing. The combination of alternating conveying elements with distributive mixing elements cause the material flow to be continuously interrupted without shearing of the mass thus resulting in mixing of the material at low mechanical energy input. To achieve medium shear mixing a combination of alternating small pitch conveying elements and kneading blocks, and optionally reverse screw elements may be employed. For high shear mixing, more and longer kneading blocks and reverse screw elements may be used compared to a medium shear screw configuration.

In other embodiments of the invention, other extruder screw configurations may be used that facilitate low shear distributive mixing, such as screw elements of the type ZME, TME, SME, and so-called IGEL elements commercially available from Werner and Pfleiderer. For medium shear and high shear mixing screw elements which are kneading blocks and reverse screw elements having various lengths and pitches which are commercially available may be employed. For example, commercially available kneading blocks or reverse screw elements having a length of 12 or 24 mm may be employed for medium shear mixing screw configurations. Commercially available kneading and reverse screw elements having a length of 36 mm may be additionally employed for high shear mixing configurations.

The total length of the distributive mixing section may be about 3 to 12 l/d, preferably about 4 to 6 l/d to sufficiently admix and distribute the ingredients to obtain an at least substantially homogeneous mixture or blend or dough.

The at least substantially homogeneous mixture of resistant starch type III ingredient or bulking agent and other ingredients, or dough, may then be conveyed towards an extruder die plate. The conveying may be achieved by the use of low pitch extruder screw conveying elements which build up sufficient pressure prior to extruding the mix so that it can be forced through the apertures in the die plate. Another function of the low pitch elements is that they increase the degree of fill inside the last extruder barrel section. The increased degree of fill enables control of the temperature profile of the mix inside the extruder barrel for achieving optimum viscosity adjustment and extrusion through the subsequent die openings.

A medium shear mixing screw configuration 1 which may be employed in the present invention is illustrated in FIG. 1. As shown in FIG. 1, a dry powder mix 3 of the dry ingredients are added to the first barrel of the extruder 5. In the first barrel, a 16/16 (pitch/length in mm) mixing and conveying element 8 is followed by two wider pitch 36/36 mixing and conveying elements 10 which mix and convey the powder into the second and third barrels where water 12 is added for admixture with the powder. Four smaller pitch 24/24 elements 14, followed by an even smaller pitch 16/16 element 16 are employed for admixing the water with the powder. The shear is increased with the use of a kneading block section 17 having two kneading block elements 18, 20. The first or upstream kneading block element 18 has an angle of 45°, five blocks, and a length of 24 mm (referred to as KB45/5/24 where KB stands for kneading block and the numbers refer to angle/number of blocks/length). The second or downstream kneading block 20 is a KB45/5/12 element. The latter, shorter kneading block element 20 is followed by six of the smaller pitch 24/24 mixing and conveying elements 14 which produce less shear than the kneading block elements 18, 20. For the remaining screw elements, the pattern of alternating kneading or increased shear elements which is followed by more relaxed mixing and conveying elements is repeated three more times to the end of the 700 mm screw for extrusion of the dough through the extruder die 25. The distance between the kneading block sections 28 and the length of the kneading block sections 28 are decreased as the remaining kneading block sections 28 get closer to the die 25. Thus, the remaining screw elements, from the upstream to downstream direction are: one KB45/5/24 element 18, one KB45/5/12 element 20, five 24/24 elements 14, two KB45/5/12 elements 20, three 24/24 elements 14, one KB45/5/12 element 20, one wide pitch 36/36 element 10, one 24/12 element 30 and one 24/24 element.

In embodiments of the invention, extruding the cooked dough through the die may be at a die temperature of at least about 100° C., preferably at least about 125° C., for example from about 130° C. to about 160° C. and a die pressure of at least about 150 psig, preferably at least about 250 psig, for example from about 200 psig to about 1000 psig, preferably from about 300 psig to about 800 psig to substantially expand the cooked dough. The extrudate expands at the exposure to atmospheric pressure just outside of the die, referred to as "flashing off" of moisture.

The dough may be extruded through extrusion dies with exemplary aperture diameters of from about 1 mm to about 10 mm, preferably from about 3 mm to about 8 mm, for example about 3 mm to about 4 mm. The diameter of the extrudate rope and product may be from about 25% to about 300%, preferably about 50% to about 200% larger than the diameter of the die apertures due to substantial expansion as the dough composition exits the die. The increase in diameter upon exiting the die may occur with substantial development of an expanded, puffed, foamy, or uniform cellular structure. In embodiments of the invention, the extruded, expanded rope may have a cross-sectional diameter of from about 1.25 mm to about 30 mm.

The expanded and cooked dough or extrudate rope may be cut at the die face using a rotating cutter, pelletizer, or rotating knives. In other embodiments, the extrudate rope may be cut away from the die using conventional cutting or forming means for producing ready-to-eat cereals or expanded sweet or savory snacks. The cut pieces may have a length:diameter ratio (l/d ratio) of about 0.5 to 10, for example about 1 to about 3. Generally, when cutting at the die face, the cut pieces may have an l/d ratio of about 0.5 to about 3, preferably about 1 to about 2. When cutting away from the die, the cut pieces may have any desirable l/d, such as those which provide a bite-size stick shape or longer.

In accordance with the process of the present invention, the particle size may be varied to control the surface to volume ratio of the pellets or pieces for adjustment of the bowl life. The particle size may be varied, for example, by the use of different diameters for the extrusion die openings. Particle size may also be varied by the use of a variable speed cutter either at the die plate at the end of the extruder or away from the extruder after the ropes have been conveyed for a short distance. By varying the speed of the cutter, the size of the cut pieces may be varied for a given extruder throughput. The use of a variable cutter which is spaced a short distance from the die plate, for example, between about 0.5 meters to about 5 meters permits further surface cooling, further surface drying, and reduced stickiness to provide better cutting of the ropes into pieces.

In embodiments of the invention, the extruded pieces may be subjected to conventional flaking operations, for example using counter-rotating flaking rolls, for producing flaked ready-to-eat cereals or other flaked products for human or animal consumption.

After cutting, and optional flaking, the resulting pieces or flakes may be optionally dried to a sufficiently low moisture content which assures a sufficiently prolonged storage stability or shelf life. For example, the pieces may be dried to achieve a storage stability or shelf life of at least about nine months, preferably at least about eighteen months, most preferably at least about thirty-six months. In embodiments of the present invention, the drying may be performed using conventional drying equipment using drying temperatures which do not adversely affect the thermal stability of the components. Exemplary drying temperatures may range from about 20° C. to about 120° C., preferably from about 60° C. to about 100° C., more preferably from about 70° C. to about 90° C. The drying may be conducted to achieve a moisture content of less than about 12% by weight, preferably less than about 6% by weight, for example, from about 1% by weight to about 4% by weight, based upon the weight of the expanded food product, exclusive of any inclusions.

The expanded, extruded products of the present invention may have a relative vapor pressure ("water activity") of less than about 0.7, preferably less than about 0.6, for preservative free microbial shelf-stability.

The ready-to-eat cereal doughs or snack doughs of the present invention may be used for the production of reduced calorie ready-to-eat cereals in the form of puffed balls, rings, strands, sticks, stars, clusters, animal shapes, and other conventional cereal shapes and forms, and reduced calorie expanded snacks such as cheese balls, cheese sticks, puffed rice crackers and the like.

The present invention is further illustrated in the following examples, where all parts, ratios, and percentages are by weight, and all temperatures are in ° C., unless otherwise stated:

EXAMPLE 1

In this example, the extrusion functionality of an enzyme resistant starch type III ingredient or bulking agent having at least 30% by weight of an amylase-resistant starch type III having a melting point with an endothermic peak temperature of at least about 140° C. as determined by modulated differential scanning calorimetry (MDSC), and a water-holding capacity of less than 3 grams water per gram of the starch-based bulking agent (hereinafter also referred to as X-150), is shown to be unexpectedly superior in the production of expanded food products. The unexpectedly superior functionality of X-150 is compared to the extrusion functionality of:

1) a commercially available, enzyme resistant starch type II ingredient (Hi Maize 1043, produced by National Starch and Chemical Co.),
2) a commercially available RS type III having an endothermic peak temperature substantially less than 140° C. as determined by MDSC, (Novelose 330, a.k.a. Hi Maize 330, National Starch Co.), and
3) a commercially available, enzyme resistant starch type IV ingredient (Fibersym 70, a.k.a. Fiberstar 70, produced by MGP Ingredients)

using conventional, non-heat-treated wheat flour as Control.

The X-150 RS Type III Ingredient or Bulking Agent

The enzyme resistant starch type III ingredient or bulking agent having an amylase-resistant starch type III having a melting point with an endothermic peak temperature of at least about 140° C. (X-150) employed in the present invention may be produced as disclosed in each of U.S. Pat. Nos. 6,013,299, 6,352,733, and 6,613,373 to Haynes et al, Example 6, Sample MC-15, the disclosure of which is herein incorporated by reference in its entirety. An X-150 RS type III ingredient or bulking agent as disclosed therein, which may be employed in the present invention, may have a yield or resistant starch type III content after heat treatment of about 45.7% (dry basis), an onset of melting of the resistant starch isolate of about 129.6° C., a melting point peak for the resistant starch isolate of about 151.2° C., and an end point of melting for the resistant starch isolate of about 165.2° C., and an enzyme resistant starch enthalpy of the crystalline melt of about 8.9 J/g. As shown in Tables 3 and 4 below and in FIG. 6, an X-150 RS type III ingredient (raw material) employed to demonstrate extrusion functionality in the present invention had a total theoretical fiber content of 50% by weight, an MDSC enthalpy (reversing heat flow) of about 3.20 J/g, an onset of melting of the resistant starch isolate of about 140° C., a melting point peak for the resistant starch isolate of about 158° C., and an end point of melting for the resistant starch isolate of about 169° C.

Hi Maize 1043 (A Resistant Starch Type II)

Hi Maize 1043 has the following characteristics, according to its manufacturer National Starch and Chemical Co.:

Color: white to off-white
Form: fine powder
Avg. particle size: 10-15 microns
Moisture: 13% maximum
Total dietary fiber (AOAC method 991.43): 60% minimum (dry basis)
Calories: approx. 1.6 kCal/g Novelose 330 or Hi-Maize 330 (A Resistant Starch Type III)

Novelose 330 or Hi-Maize 330 has the following characteristics, according to its manufacturer National Starch and Chemical Co.:

Color: white to off-white
Form: fine powder
Avg. particle size: 40 microns
Moisture (CML-100): 8%
Total dietary fiber (AOAC method 991.43): 30% minimum (dry basis)
Calories: approx. 2.8 kCal/g Fibersym 70 (A Resistant Starch Type IV)

Fibersym 70 has the following characteristics, according to its manufacturer MGP Ingredients:

Color: white to off-white
Form: fine powder
Moisture: 10.6% typical
Total dietary fiber (AOAC method 991.43): 70% minimum (dry basis)
Calories: approx. 3.6 kcal/g Extrusion functionality was evaluated by measurement of density, moisture content, texture (brittleness) and cell structure. Resistant starch ingredients that resulted in cereal properties as close to the properties achieved with the wheat flour Control were considered to have the best extrusion functionality. Total dietary fiber was used to determine thermal and shear stability of the resistant starch ingredients.

Control was produced following a standard formula for extruded, expanded, RTE cereals. In test samples, 50% of the total flour weight in the formula (including wheat flour, ground cereal fines and barley malted flour) was replaced by a resistant starch, namely X150 (variable 1), Hi Maize 1043 (variable 2), Fibersym 70 (variable 3), or Novelose 330 (Formulas 1 and 2) with the objective of testing their functionality as flour replacers. The equipment, formulas, mixing procedure, extrusion procedure, and measurement procedure used in the test were:

Equipment
Scale
Weighing Recipients
Hobart mixer: M-802 U; bowl capacity=80 quarts; 3HP motor; paddle attachment Werner & Pfleiderer ZSK 25 MC twin-screw extruder with ¼" 2-strand die, set up at a medium-shear screw profile (shown in FIG. 1)
Metering pump: American Lewa, Inc., Triplex Piston Pump; Capacity: 0-30 lb/hr
Powder feeder for extruder: Accurate Loss-in-Weight Feeder; Capacity: 0-60 lb/hr
Plastic bags for sample collection.

Formulas:
The formulas are shown in Table 1:

TABLE 1

Cereal Formulas

| Ingredient | Control % (w/w) | Control Weight (lb) | Variable 1: X150 % (w/w) | Variable 1: X150 Weight (lb) | Variable 2: Hi Maize 1043 % (w/w) | Variable 2: Hi Maize 1043 Weight (lb) | Variable 3: Fibersym 70 % (w/w) | Variable 3: Fibersym 70 Weight (lb) | Formula 1 Hi Maize 330 % (w/w) | Formula 1 Hi Maize 330 Weight (lb) | Formula 2 Hi Maize 330 % (w/w) | Formula 2 Hi Maize 330 Weight (lb) |
|---|---|---|---|---|---|---|---|---|---|---|---|---|
| Hard red winter wheat flour | 74.26 | 37.12 | 37.14 | 18.56 | 37.14 | 18.56 | 37.14 | 18.56 | 37.10 | 18.60 | 63.10 | 31.60 |
| X150 | 0.00 | 0.00 | 48.11 | 24.06 | 0.00 | 0.00 | 0.00 | 0.00 | 0.00 | 0.00 | 0.00 | 0.00 |
| Hi Maize 1043 | 0.00 | 0.00 | 0.00 | 0.00 | 48.11 | 24.06 | 0.00 | 0.00 | 0.00 | 0.00 | 0.00 | 0.00 |
| Fibersym 70 | 0.00 | 0.00 | 0.00 | 0.00 | 0.00 | 0.00 | 48.11 | 24.06 | 0.00 | 0.00 | 0.00 | 0.00 |
| Hi Maize 330 | 0.00 | 0.00 | 0.00 | 0.00 | 0.00 | 0.00 | 0.00 | 0.00 | 48.10 | 24.10 | 14.40 | 7.20 |
| Ground cereal fines* | 14.99 | 7.50 | 7.50 | 3.75 | 7.50 | 3.75 | 7.50 | 3.75 | 7.50 | 3.80 | 12.70 | 6.40 |
| Barley malted flour | 7.00 | 3.50 | 3.50 | 1.75 | 3.50 | 1.75 | 3.50 | 1.75 | 3.50 | 1.80 | 6.00 | 3.00 |
| Granulated sugar | 2.00 | 1.00 | 2.00 | 1.00 | 2.00 | 1.00 | 2.00 | 1.00 | 2.00 | 1.00 | 2.00 | 1.00 |
| Fine granular salt | 1.25 | 0.63 | 1.25 | 0.63 | 1.25 | 0.63 | 1.25 | 0.63 | 1.25 | 0.63 | 1.25 | 0.63 |
| Trisodium phosphate dodecahydrate | 0.50 | 0.25 | 0.50 | 0.25 | 0.50 | 0.25 | 0.50 | 0.25 | 0.50 | 0.25 | 0.50 | 0.25 |
| Total | 100.00 | 50.00 | 100.00 | 50.00 | 100.00 | 50.00 | 100.00 | 50.00 | 100.00 | 50.00 | 100.00 | 50.00 |

*Granulation: on US#18: 1% max.; on US#40: 20% max.; on US# 100: 40% max.

Mixing:
All dry ingredients in each formulation shown in Table 1 were mixed for 4 minutes in a Hobart mixer, to ensure homogeneity of the dry feed.

Extrusion:
The operating conditions used in the extruder to produce the cereal samples are shown in Table 2:

TABLE 2

Operating conditions used in a Werner & Pfleiderer ZSK 25 extruder

| Processing Parameter | Control Set point | Control Actual | Variable 1: X150 Set point | Variable 1: X150 Actual | Variable 2: Hi Maize 1043 Set point | Variable 2: Hi Maize 1043 Actual | Variable 3: Fibersym 70 Set point | Variable 3: Fibersym 70 Actual | Formula 1B Hi Maize 330 @ 50% Set point | Formula 1B Hi Maize 330 @ 50% Actual | Formula 1C Hi Maize 330 @ 50% Set point | Formula 1C Hi Maize 330 @ 50% Actual | Formula 2A Hi Maize 330 @ 15% Set point | Formula 2A Hi Maize 330 @ 15% Actual |
|---|---|---|---|---|---|---|---|---|---|---|---|---|---|---|
| Barrel temp., zone 1 & 2 (° C.) | 80.0 | 79.0 | 80.0 | 81.0 | 80.0 | 80.0 | 80.0 | 80.0 | 80.0 | 80.0 | 80.0 | 80.0 | 80.0 | 81.0 |
| Barrel temp., zone 3 & 4 (° C.) | 110.0 | 110.0 | 110.0 | 110.0 | 110.0 | 110.0 | 110.0 | 110.0 | 110.0 | 110.0 | 111.0 | 110.0 | 110.0 | 111.0 |
| Barrel temp., zone 5 & 6 (° C.) | 125.0 | 125.0 | 125.0 | 125.0 | 125.0 | 126.0 | 125.0 | 127.0 | 125.0 | 125.0 | 125.0 | 125.0 | 125.0 | 125.0 |
| Screw speed (rpm) | 200.0 | 203.0 | 200.0 | 203.0 | 300.0* | 301.0* | 350.0* | 352.0* | 300.0 | 302.0 | 300.0 | 302.0 | 200.0 | 202.0 |
| Powder feed rate (lb/h) | 40.0 | 40.0 | 40.0 | 40.0 | 30.0* | 30.0* | 42.0* | 42.0* | 30.0 | 30.0 | 30.0 | 30.0 | 33.0 | 33.7 |
| Water feed rate (lb/h) | 3.2 | 3.2 | 3.2 | 3.2 | 2.8* | 2.8* | 2.5* | 2.5* | 3.0 | 3.0 | 2.8 | 2.8 | 2.8 | 2.8 |
| Torque (%) | | 45 | | 49 | | 30 | | 36 | | 34 | | 37 | | 39 |
| Die pressure (psig) | | 801 | | 465 | | 118 | | 246 | | 247 | | 250 | | 451 |

TABLE 2-continued

Operating conditions used in a Werner & Pfleiderer ZSK 25 extruder

| Processing Parameter | Control Set point | Control Actual | Variable 1: X150 Set point | Variable 1: X150 Actual | Variable 2: Hi Maize 1043 Set point | Variable 2: Hi Maize 1043 Actual | Variable 3: Fibersym 70 Set point | Variable 3: Fibersym 70 Actual | Formula 1B Hi Maize 330 @ 50% Set point | Formula 1B Hi Maize 330 @ 50% Actual | Formula 1C Hi Maize 330 @ 50% Set point | Formula 1C Hi Maize 330 @ 50% Actual | Formula 2A Hi Maize 330 @ 15% Set point | Formula 2A Hi Maize 330 @ 15% Actual |
|---|---|---|---|---|---|---|---|---|---|---|---|---|---|---|
| Die temperature (° C.) | | 148 | | 151 | | 153 | | 166 | | 154 | | 155 | | 148 |

*Hi Maize 1043 and Fibersym 70 extrusion operated at different conditions to prevent caking at the feeding port.

Measurements:

Measurements for bulk density, moisture content, enthalpy, melting peak temperatures, color, total dietary fiber content, brittleness, cell structure, and bowl life were made as follows:

a. Bulk density was calculated by: a) cutting cylindrical pieces of cereal, weighing them and measuring their diameter and height; b) dividing the piece weight by its volume (calculated from the dimensions of the cylindrical piece).
b. % Moisture was determined by heating in a vacuum oven for 16 h at 70° C.
c. The MDSC enthalpy and melting peak temperature for the raw materials was measured as in Example 2.
d. The MDSC enthalpy and melting peak temperature for the cereals was measured as in Example 2.
e. Cereal samples were ground and their L*, a*, and b* values (which are standard color measurements of the Committee on International Illuminescence) were measured using a Hunter Lab Colorimeter (Miniscan XE, Mod. No. 45/0-L, Hunter Associate Laboratories Inc., Reston, Va.) equipped with a Hunter Lab Universal Software version 4.01.
f. Total dietary fiber content for each cereal was measured using the Prosky method (AOAC method 991.43, J. Assoc. Anal. Chem., 68(2), pp. 399 (1985) and AOAC, Official Methods of Analysis, J. Assoc. Anal. Chem., 15th ed., pp. 1105-1106 (1990)).
g. Brittleness of the dry, extruded cereals was measured using a texture analyzer (TA-XT2, Texture Technologies Corporation, Scarsdale, N.Y.) equipped with a 25 kg loadcell. The test consisted of shearing the sample using a guillotine, while measuring the resistance to deformation. Brittleness was obtained by plotting peak force (g) vs. peak distance (deformation at which the maximum peak force occurs, mm). Data were collected using Texture Expert Exceed software (Texture Technologies Corporation, Scarsdale, N.Y.).
h. Cell structure was captured using a digital camera (Hasselblad (Sweden)555 ELD medium format with a Leaf Cantare xy digital back). Photographs of a cross section of the cereal samples were captured at the same magnification for each sample.
i. Bowl life was determined by plotting force vs. distance (deformation) when a sample of cereal was soaked for 30 minutes in 8° C. water and then compressed using a TA-XT2 (HDi, Texture Technologies Corporation, Scarsdale, N.Y.) equipped with a 250 kg loadcell. Since the density of the cereals was variable, a constant volume was kept throughout the tests (weight was recorded). Data were collected using Texture Expert Exceed software (Texture Technologies Corporation, Scarsdale, N.Y.).

Results of the final product property measurements for bulk density, moisture content, enthalpy, melting peak temperature, and color are presented in Table 3, and measurements for fiber content are presented in Table 4:

TABLE 3

Final Product Property Measurements

| | Bulk Density (g/cm$^3$) | Moisture (%) | MDSC Enthalpy @ >140° C. (J/g)* | RS Melting Peak Temperature (° C.) | Color L*, a*, b* |
|---|---|---|---|---|---|
| X150, raw material | — | — | 3.20 | 158.0 | — |
| Hi Maize 1043, raw material | — | — | 0 | none | — |
| Fibersym 70, raw material | — | — | 0 | none | — |
| Novelose 330 (Hi Maize 330), raw material | — | — | 1.22 | 106.2 | — |
| Control cereal | 0.452 | 9.73 | 0 | none | 70.61, 3.81, 25.33 |
| X150 cereal, 50% flour replacement | 0.309 | 9.99 | 2.87 | 152.1 | 68.49, 4.62, 25.59 |
| Hi Maize 1043 cereal, 50% flour replacement | 0.195 | 10.02 | 1.70 | 147.8 | 75.29, 2.47, 22.26 |
| Fibersym 70 cereal, 50% flour replacement | 0.365 | 7.81 | 0 | none | 73.39, 3.21, 26.74 |
| Novelose 330 (Hi Maize 330), 50% Formula 1B | 0.2924 | 8.6 | — | — | — |
| Novelose 330 (Hi Maize 330), 50% Formula 1C | 0.3276 | 9.3 | — | — | — |

TABLE 3-continued

Final Product Property Measurements

| | Bulk Density (g/cm³) | Moisture (%) | MDSC Enthalpy @ >140° C. (J/g)* | RS Melting Peak Temperature (° C.) | Color L*, a*, b* |
|---|---|---|---|---|---|
| Novelose 330 (Hi Maize 330), 15% Formula 2A | 0.4151 | 10.0 | — | — | — |

*Joules per g of flour, g of X150 in flour blend, g of Hi Maize in flour blend, or g of Fibersym in flour blend, respectively.

TABLE 4

Fiber Content in Extruded, RTE Cereals

| | % Total Dietary Fiber, Theoretical[a] | % AOAC Total Dietary Fiber[b] | % Fiber Retention in RS Ingredient[c] |
|---|---|---|---|
| X150 ingredient | 50 | — | — |
| Hi Maize 1043 Ingredient | 62 | — | — |
| Fibersym 70 ingredient | 70, min. | 80 | — |
| Novelose 330 (Hi Maize 330) ingredient | 30 | — | — |
| Control cereal | 5.58 | 7.7 | — |
| X150 cereal, 50% flour replacement | 23.3 | 22.4 | 96 |
| Hi Maize 1043 cereal, 50% flour replacement | 30.7 | 19.4 | 63 |
| Fibersym 70 cereal, 50% flour replacement | 34.1 | 12.60 | 37 |
| Novelose 330 (Hi Maize 330), 50% Formula 1B | 15.8 | 13.2 | 83.5 |
| Novelose 330 (Hi Maize 330), 50% Formula 1C | 15.7 | 12.9 | 82.2 |
| Novelose 330 (Hi Maize 330), 15% Formula 2A | 9.76 | 8.45 | 86.6 |

[a]Calculated based on fiber content of ingredient declared in specifications
[b]As measured by AOAC 991.43
[c]Calculated based on % Total Dietary Fiber in RS ingredient, declared in specifications, vs. % Fiber in RS Ingredient After Processing Discussion of Results A. RS Type II and RS Type IV Extrusion runs of samples containing Hi Maize 1043 and Fibersym 70 were operated at different conditions than Control and X-150 containing samples in order to prevent caking at the feeding port. Hi Maize 1043 extrusion was conducted at a higher screw speed and lower powder and water feed rates than Control and X-150 containing samples, resulting in 7.41% (w.b.) added water in Control formula and X150 samples and 8.54% (w.b.) added water in Hi Maize 1043 formula samples. Fibersym 70 extrusion was conducted at a higher screw speed, slightly higher powder feed and lower water feed rates than Control and X-150 containing samples, resulting in 5.62% (w.b.) added water in Fibersym 70 formula samples.

As shown in Table 3, the bulk density of the three test samples was lower than Control, in the following descending order: Fibersym 70>X150>Hi Maize 1043. Bulk density is an important parameter when dealing with packing of a standard weight of cereals in a standard volume.

Moisture content was similar in Control and samples containing X-150 and Hi Maize 1043, indicating that the moisture was effectively "flashed off" at the extruder die. Samples containing Fibersym 70 presented a lower moisture content, due to the conditions used for extrusion.

Figure 6:
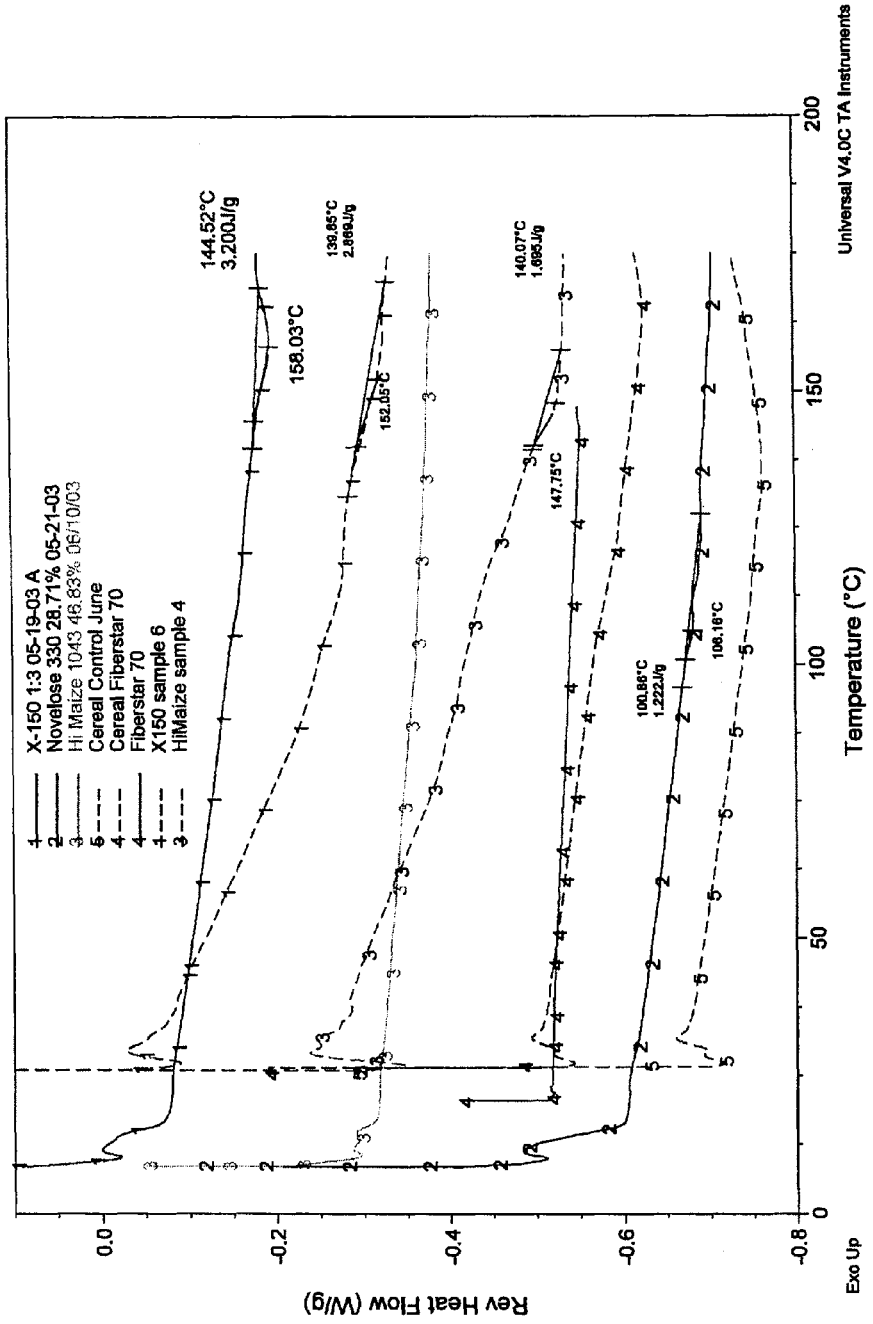
FIG. 6 shows results of an MDSC analysis (reversing heat flow) for Hi Maize 1043, X150, the Control, Fibersym 70 (also referred to as Fiberstar 70) and Novelose 330 (also referred to as Hi Maize 330) where the solid lines are for the resistant starch ingredient and the dashed lines are for the cereal made with the resistant starch ingredient.

As shown in Table 3 and FIG. 6, resistant starch raw materials X150, Hi Maize 1043, Fibersym 70 (Fiberstar 70) and Novelose 330 (Hi Maize 330) had MDSC enthalpies (reversing heat flow) of 3.20 J/g, 0 J/g, 0 J/g, and 1.22 J/g, respectively, at temperatures above 140° C.

Control did not present a MDSC enthalpy above 140° C., indicating that no enzyme resistant starch was present and that none was created during processing. Cereal samples containing X 150 presented a MDSC enthalpy (reversing heat flow) of 2.87 J/g (based on g of X150 in the flour blend), comparable to that of the X 150 raw material, indicating that the X150 ingredient was stable during extrusion. In addition, it presented a high melting point of 152.1° C., corresponding to enzyme resistant starch ingredients (see Example 2 below). Since it remained unchanged during extrusion, X150 was very identifiable in the final product.

Cereal samples containing Hi Maize 1043 presented a MDSC enthalpy (reversing heat flow) of about 1.70 J/g (based on g of Hi Maize 1043 in the flour blend). Thus, generation of crystalline resistant starch, believed to result from high temperature/moisture processes, occurred during extrusion. A smaller enthalpy than that for X150 represented a sample with less degree of crystallinity and, thus, less content of enzyme resistant starch. In addition, the generated enzyme resistant starch had a lower melting point than that of X150. Cereal samples containing Fibersym 70 did not present a MDSC enthalpy (reversing heat flow).

L*, a* and b* values indicated that samples containing X150 were darker and redder in color than Control, which was expected due to a dark color of the X150 ingredient itself. This color could be modified during commercial manufacture of such ingredient, if needed. Samples containing Hi Maize 1043 were lighter in color, less red and less yellow than Control, due to a white color of the Hi Maize 1043 ingredient. Samples containing Fibersym 70 were lighter in color, less red and slightly more yellow than Control, due to a white color of the Fibersym 70 ingredient.

As shown in Table 4, the theoretical total dietary fiber content in the resistant starches corresponded to: X-150=50%; Hi Maize 1043=62%; Fibersym 70=70% (although it assayed at 80% using the AOAC 991.43 method); and Novelose 330 (Hi Maize 330)=30%, based on the fiber content of the ingredient declared in the product specifications.

Although cereal samples containing Hi Maize 1043 had a higher theoretical dietary fiber content than cereal samples containing X150, calculated based on fiber content of the ingredient declared in the specifications, the measured AOAC total dietary fiber for cereal samples containing X150 was higher than that for cereal samples containing Hi Maize 1043.

The calculated % fiber retention (i.e. fiber that survived processing+being generated during processing) corresponded then to 96% for X150 cereals and only 63% for Hi Maize 1043 cereals.

Figure 2:
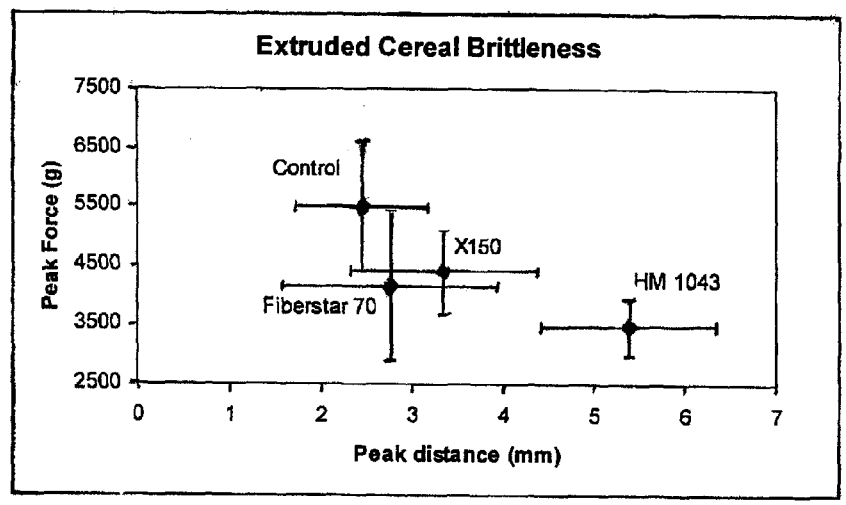
FIG. 2 shows extruded brittleness data for samples containing the Control, and X-150, Hi-Maize 1043 and Fiberstar 70 resistant starches.

Although cereal samples containing Fibersym 70 had the highest theoretical dietary fiber content than the rest of the samples, calculated based on measured fiber content of the ingredient (80%), the measured AOAC total dietary fiber for cereal samples containing Fibersym 70 was the lowest of all the samples. The calculated % fiber retention corresponded to only 37%. This suggests that Fibersym 70 did not completely survive high temperature and high shear conditions present during extrusion. Cereal brittleness is presented in FIG. 2. A high peak force and low peak distance would correspond to a brittle sample, while a low peak force and high peak distance would correspond to a less brittle sample. The x and y-axis error bars represent +/−1 standard deviation, while the diamonds represent averages. Overlapping error bars represent samples that were not significantly different from one another. In this case, Control, X-150 and Fibersym 70 samples did not present a significantly different peak force or a significantly different peak distance, indicating that they possessed a similar brittleness. Hi Maize 1043 samples showed a larger peak distance than the rest of the samples, indicating a lower brittleness. Hi Maize 1043 samples did not present a significantly different peak force than X150 or Fibersym 70 samples, but were significantly softer (lower peak force) than Control.

Figure 3:
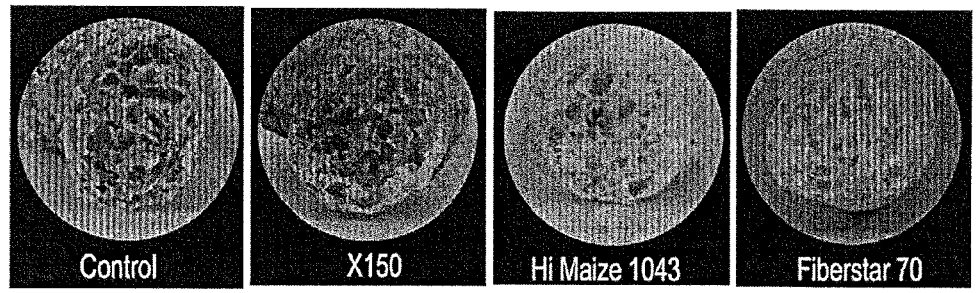
FIG. 3 shows cell structures for extruded cereal samples containing the Control, and X-150, Hi-Maize 1043 and Fiberstar 70 resistant starches.

As shown in FIG. 3, air cells were more numerous and larger in Control than in the rest of the samples, characteristic which can be correlated to bulk density. Cell structure is the result of expansion during extrusion, governed by moisture content, moisture flash-off and flour blend (matrix) physicochemical properties.

Figure 4:
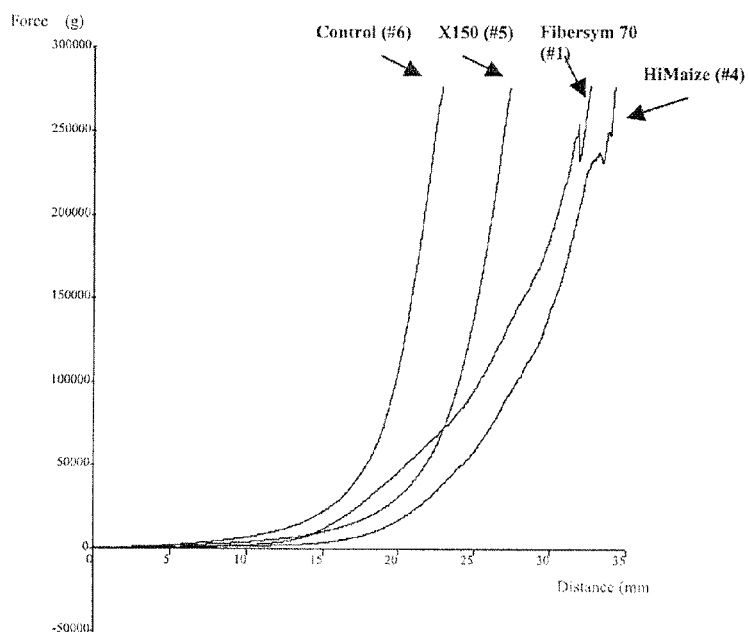
FIG. 4 shows extruded cereal bowl life for extruded cereal samples containing the Control, and X-150, Hi-Maize 1043 and Fiberstar 70 resistant starches.

As shown in FIG. 4, cereal samples containing X150 showed superiority in bowl life when compared to the other two resistant starch-containing samples; i.e. X150 samples force vs. distance (deformation) behavior after soaking in 8° C. water for 30 minutes was closer to Control than that of Fibersym 70 and Hi Maize 1043. For example, if a distance of 10 mm was chosen on the force vs. distance plot, it can be seen that Control was harder (higher force) than the rest of the samples, and that X150 was harder (higher force) than Hi Maize 1043 and Fibersym 70. The same behavior was observed at deformations above 23 mm. In between 15 and 23 mm of deformation, Fibersym 70 presented a higher force than both Hi Maize 1043 and X150, but its force vs. deformation curve behaved in a very different manner than Control.

In summary, and as shown by the results discussed above, samples containing X150 had a superior extruding functionality and dietary fiber content compared to Hi Maize 1043 and Fibersym 70.

B. RS Type III (Novelose 330 or Hi-Maize 330)

The formulation #2 with 15% Novelose 330 was run first. It extruded and formed well. It was cut at the die face to form spherical shaped cereal pieces. There were no processing issues. The formulation #1 with 50% Hi-Maize 330 was difficult to process at the same target processing conditions as for the formulation #2. The dough swelling and expansion inside the extruder barrels led to powder backup in the feed barrel and eventually shutdown of the extruder. It was necessary to lower the feed rate and to increase the screw rpm to compensate for dough expansion during extrusion. The feed rate was lowered to 30 lb/hr v. 33.7 lb/hr for the formulation #1, and the screw rpm was raised to 300 v. 200 for the formulation #1. Under the revised set of processing conditions, it was possible to extrusion cook and form the product in spherical shaped cereal pieces.

Extrusion of samples containing Novelose 330 at 50% replacement was operated at higher screw speed and lower powder and water feed rates than the 15% replacement level, resulting in lower throughput. If operated under the same conditions as control or the 15% replacement level, the Novelose 330 feed caked at the feeding port, was not easily transported by the screw elements, and caused a backflow or burning of the material inside the extruder barrel.

As shown in Table 3, the cereal containing 15% replacement of flour blend with Novelose 330 exhibited a bulk density closer to control than cereal containing 50% replacement of the flour blend with 330, which is an important parameter when dealing with packing of a standard weight of the material in a standard volume.

Moisture content was similar in samples containing enzyme-resistant starches, and both were similar to control, indicating that the moisture was effectively "flashed off" at the die exit for all the samples.

As shown in Table 4, cereal samples containing Novelose 330 had a higher theoretical dietary fiber than cereal samples without Novelose 330 (the Control). Fiber values are calculated based on fiber content of the flour blend (in accordance with the USDA nutrition database for fiber in flour ingredients) and Novelose 330 fiber declared in the specifications (30% for Novelose 330). The measured values according to the AOAC total dietary fiber method for cereal samples containing Novelose 330 were lower than expected for cereal samples containing Novelose 330. The calculated % fiber retention in the cereals corresponded then to 82.2% and 83.5% fiber retained for Novelose 330 used at 50% replacement of the flour blend in formula 1 and 86.6% retention of fiber when Novelose is used at the 15% flour replacement.

Figure 5:
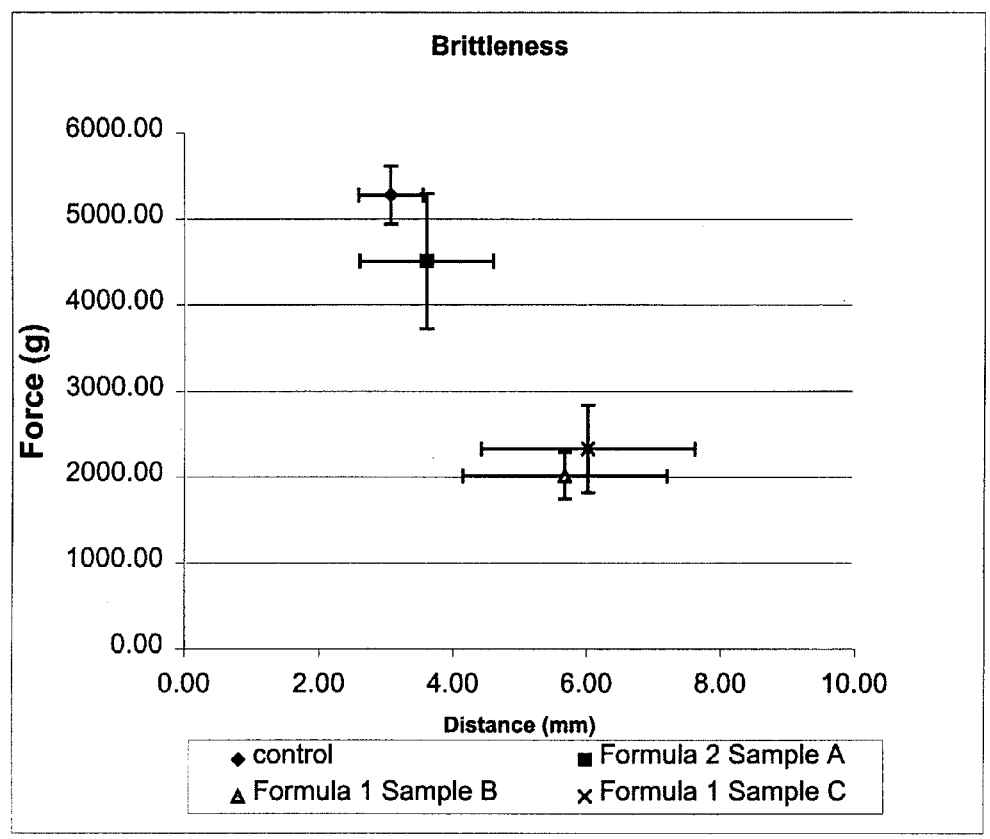
FIG. 5 shows extruded brittleness data for samples containing the Control, and Novelose 330 or Hi-Maize 330 resistant starch.

For the extruded cereal brittleness data shown in FIG. 5, the x-axis and y-axis error bars represent +/−1 standard deviation, while the points represent averages. Overlapping error bars represent samples that were not significantly different from one another. In this case, the 15% Novelose 330 sample has a significantly different peak force from the 50% Novelose sample, indicating that they possessed a different brittleness. Novelose 330 at 50% level samples showed a larger peak distance than both control and 15% samples, indicating a lower brittleness.

EXAMPLE 2

Determination of Melting Profile of Resistant Starches Type II, III and IV and of Cereals Containing Resistant Starches Type II, III and IV by MDSC The melting profile or thermal characteristics of the resistant starches Type II, III and IV, as well as the cereals containing these ingredients, were determined by modulating differential scanning calorimetry (MDSC). In this technique, the material being analyzed is heated at a steady rate with a programmed saw-tooth pattern of heating and cooling imposed upon the steady rate. The fluctuation in temperature in the saw-tooth pattern is about 1° C. The MDSC technique allows a more precise analysis of the equilibrium melting point because it separates overlapping thermal events such as irreversible decomposition.

The instruments and method used to characterize the ingredients are:
a) Instrument: TA Instruments Modulated Differential Scanning calorimeter (MDSC), which includes the TA Instruments DSC 2920 Controller, TA Instruments 2920 Module and the TA Instruments RCS 1061 unit.
b) Sample Pans: Perkin-Elmer stainless steel high pressure capsules with o-ring
c) Sample preparation: The ingredients are mixed with water at a 1:1 solids to water ratio. Approximately 30 milligrams of the moist ingredient are weighed in a DSC sample pan. Cereal samples were ground into a fine powder before mixing with water.
d) Instrument calibration: the modulated DSC is calibrated for baseline, cell constant, temperature and heat capacity in a known manner:
  1. Baseline calibration: using two empty sample pans the baseline slope and baseline offset are determined over a temperature range from 10 to 270° C., with a heating rate of 5° C./min
  2. Cell constant calibration: indium is used as a standard
  3. Temperature calibration: calibrated at two points using indium and tin
  4. Heat Capacity and Sample Characterization: The DSC calibration data analysis software program is used to make the proper DSC calibration corrections with the instrument in the calibration mode. Heat capacity is calibrated using sapphire, high density polyethylene and polyethylene terephthalate, in a known manner. The sample is characterized with the MDSC in the Modulated mode using a modulation of +/−0.5° C. every 80 sec., and a ramp rate of 4° C. from 25 to 200° C. To analyze the results, the reversing heat flow curve is integrated from 130° C. to 164° C. to measure the enthalpy of the enzyme resistant starch types II and III. Samples are run at least in duplicate.

Results of the MDSC analysis for Hi Maize 1043, X150 and Fibersym 70 are shown in FIG. 6. For Hi Maize 1043, the onset of melting occurs at about 93° C., the endothermic peak or melting point is about 101° C., and the endpoint of melting occurs at about 112° C. For X150, the onset of melting occurs at about 135° C., the endothermic peak or melting point is about 151.2° C., and the endpoint of melting occurs at about 165° C. For Fibersym 70, the onset of melting occurs at about 68° C., the endothermic peak or melting point is about 75° C., and the endpoint of melting occurs at about 95° C. The software calculates the enthalpy of the endothermic peak in J/g.

Results of the MDSC analysis for cereals containing resistant starch ingredients are also shown in FIG. 6. For Hi Maize 1043-containing cereal, the onset of melting occurs at about 140° C., the endothermic peak or melting point is about 148° C., and the endpoint of melting occurs at about 155° C. For X150-containing cereal, the onset of melting occurs at about 135° C., the endothermic peak or melting point is about 152° C., and the endpoint of melting occurs at about 165° C. For Fibersym 70-containing cereal, there was no MDSC enthalpy peak. The software calculates the enthalpy of the endothermic peak in J/g.

MDSC results for Novelose 330, also known as Hi-Maize 330 (National Starch & Chemical Co., Bridgewater, N.J.), another commercially available type III resistant starch, are shown in FIG. 6. The onset of melting occurs at about 101° C., the endothermic peak or melting point is about 106.2° C. and the endpoint of melting occurs at about 130° C. Thus, even though this is a type III resistant starch, it melts at a lower temperature than X150, indicating that it would not survive high temperature extrusion conditions as those used in breakfast cereal manufacture, as well as X-150 which has unexpectedly superior functionality as a fiber in producing extruded, expanded food products.

We claim:
1. A method for making an expanded food product having a high resistant starch content comprising:
  a. forming a dough by admixing water, graham flour, and a gelatinized, starch based bulking agent, said bulking agent comprising at least 30% by weight of an amylase-resistant starch type III having a melting point with an endothermic peak temperature of at least about 140° C. as determined by modulated differential scanning calorimetry (MDSC), the water-holding capacity of said starch-based bulking agent being less than 3 grams water per gram of said starch-based bulking agent,
  b. extrusion cooking the dough,
  c. extruding the cooked dough through a die at a die temperature of at least about 100° C. and a die pressure of at least about 150 psig to substantially expand the cooked dough, and
  d. cutting the expanded and cooked dough into pieces,
  wherein the total dietary fiber retention of said gelatinized, starch-based bulking agent is at least about 90% by weight after said extrusion, and wherein said pieces have an average peak force brittleness of at least about 3000 grams, and an average peak distance brittleness of less than about 4 mm.

2. A method for making an expanded food product as claimed in claim 1 wherein the amount of said bulking agent is at least about 30% by weight based upon the weight of said bulking agent and said flour.

3. A method for making an expanded food product as claimed in claim 1 wherein said extrusion cooking of the dough is at a temperature of at least about 100° C.

4. A method for making an expanded food product as claimed in claim 1 wherein said extrusion is conducted at a die pressure of from about 200 psig to about 1000 psig.

5. A method for making an expanded food product as claimed in claim 1 wherein said pieces have a bulk density of from about 0.25 g/cm³ to about 0.45 g/cm³.

6. A method for making an expanded food product as claimed in claim 1 wherein extruding of the cooked dough through the die is at a die temperature of least about 125° C. and a die pressure of at least about 250 psig.

7. A method for making an expanded food product as claimed in claim 1 wherein the amount of said bulking agent is at least about 50% by weight based upon the weight of said bulking agent and said flour.

8. A method for making an expanded food product as claimed in claim 1 wherein said die temperature is from about 130° C. to about 160° C.

9. A method for making an expanded food product as claimed in claim 1 wherein said extrusion is conducted at a die pressure of from about 300 psig to about 800 psig.

10. A method for making an expanded food product as claimed in claim 1 wherein the water feed rate is less than about 8.5% weight based upon the total feed rate of said flour, said bulking agent and the added water.

11. A method for making an expanded food product as claimed in claim 1 wherein said bulking agent comprises at least about 45% by weight of said amylase-resistant starch type III.

12. A method for making an expanded food product as claimed in claim 1 wherein said expanded food product is a ready-to-eat cereal.

13. A method for making an expanded food product as claimed in claim 1 wherein said expanded food product is a sweet or savory snack.

14. A method for making an expanded food product as claimed in claim 1 wherein the extrusion cooking is at a temperature of at least about 100° C.

15. A method for making an expanded ready-to-eat cereal having a high resistant starch content comprising:
   a. forming a dough by admixing water, graham flour, and a gelatinized, starch based bulking agent, the amount of said bulking agent being at least about 30% by weight based upon the weight of said bulking agent and said flour, said bulking agent comprising at least 30% by weight of an amylase-resistant starch type III having a melting point with an endothermic peak temperature of at least about 140° C. as determined by modulated differential scanning calorimetry (MDSC), the water-holding capacity of said starch-based bulking agent being less than 3 grams water per gram of said starch-based bulking agent,
   b. extrusion cooking the dough,
   c. extruding the cooked dough through a die at a die temperature of at least about 100° C. and a die pressure of at least about 150 psig to substantially expand the cooked dough, and
   d. cutting the expanded and cooked dough into pieces,
   wherein the total dietary fiber retention of said gelatinized, starch-based bulking agent is at least about 90% by weight after said extrusion, and wherein said pieces have an average peak force brittleness of at least about 3000 grams, and an average peak distance brittleness of less than about 4 mm.

16. A method for making an expanded ready-to-eat cereal as claimed in claim 15 wherein the amount of said bulking agent is at least about 50% by weight based upon the weight of said bulking agent and said flour.

17. A method for making an expanded ready-to-eat cereal as claimed in claim 15 wherein said pieces have a bulk density of from about 0.25 g/cm$^3$ to about 0.45 g/cm$^3$.

18. An expanded, extrusion cooked snack having a high resistant starch content comprising graham flour, and a gelatinized, starch based bulking agent, the amount of said bulking agent being at least about 30% by weight based upon the weight of said bulking agent and said graham flour, said bulking agent comprising at least 30% by weight of an amylase-resistant starch type III having a melting point with an endothermic peak temperature of at least about 140° C. as determined by modulated differential scanning calorimetry (MDSC), the water-holding capacity of said starch-based bulking agent being less than 3 grams water per gram of said starch-based bulking agent, said snack being extrusion cooked and having an average peak force brittleness of at least about 3000 grams, and an average peak distance brittleness of less than about 4 mm, and a bulk density of from about 0.25 g/cm$^3$ to about 0.45 g/cm$^3$.

19. An expanded snack having a high resistant starch content as claimed in claim 18 which is a ready-to-eat cereal wherein the amount of said bulking agent is at least about 50% by weight based upon the weight of said bulking agent and said flour.

20. An expanded, extrusion cooked food product having a high resistant starch content comprising graham flour, and a gelatinized, starch based bulking agent, the amount of said bulking agent being at least about 30% by weight based upon the weight of said bulking agent and said at least one flour, said bulking agent comprising at least 30% by weight of an amylase-resistant starch type III having a melting point with an endothermic peak temperature of at least about 140° C. as determined by modulated differential scanning calorimetry (MDSC), the water-holding capacity of said starch-based bulking agent being less than 3 grams water per gram of said starch-based bulking agent, said snack being extrusion cooked and having an average peak force brittleness of at least about 3000 grams, and an average peak distance brittleness of less than about 4 mm, and a bulk density of from about 0.25 g/cm$^3$ to about 0.45 g/cm$^3$, wherein the enthalpy value of the enzyme-resistant bulking agent or ingredient in the expanded snack food is from about 0.5 J/g to about 4 J/g, and the enzyme-resistant bulking agent or ingredient in the expanded snack food has a calorific value of less than about 2.8 calories/gram.

* * * * *